US010924601B2

(12) United States Patent
Chen et al.

(10) Patent No.: US 10,924,601 B2
(45) Date of Patent: Feb. 16, 2021

(54) LOCK SCREEN INTERFACE PROCESSING METHOD AND TERMINAL

(71) Applicant: Huawei Technologies Co., Ltd., Shenzhen (CN)

(72) Inventors: Xiaoxiao Chen, Nanjing (CN); Hui Yi, Wuhan (CN); Bo Liu, Shanghai (CN); Bifeng Tong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/630,979

(22) PCT Filed: Jul. 14, 2017

(86) PCT No.: PCT/CN2017/092886
§ 371 (c)(1),
(2) Date: Jan. 14, 2020

(87) PCT Pub. No.: WO2019/010684
PCT Pub. Date: Jan. 17, 2019

(65) Prior Publication Data
US 2020/0228641 A1 Jul. 16, 2020

(51) Int. Cl.
*G06F 3/0488* (2013.01)
*G06K 9/00* (2006.01)
(Continued)

(52) U.S. Cl.
CPC ........ *H04M 1/673* (2013.01); *G06F 3/04883* (2013.01); *G06F 9/451* (2018.02);
(Continued)

(58) Field of Classification Search
CPC ... H04M 1/673; H04M 2250/22; G06F 21/32; G06F 3/04883; G06F 9/451; G06K 9/00013
See application file for complete search history.

(56) References Cited

U.S. PATENT DOCUMENTS 7,792,544 B2   9/2010   Vogedes et al.
8,539,382 B2   9/2013   Lyon et al.
(Continued)

FOREIGN PATENT DOCUMENTS

CN   102520857 A   6/2012
CN   102890614 A   1/2013
(Continued)

OTHER PUBLICATIONS

"Unlock Android phone after too many pattern attempts," XP055056490, Jan. 8, 2010, 18 pages.

*Primary Examiner* — Joseph E Dean, Jr.
(74) *Attorney, Agent, or Firm* — Conley Rose, P.C.

(57) ABSTRACT

A lock screen interface processing method includes presenting, by a terminal, a lock screen interface, obtaining, by the terminal, an unlocking operation, where the unlocking operation includes at least one of an operation performed in the lock screen interface and an operation performed in a fingerprint recognition area, presenting, by the terminal, a prompt interface when a quantity of unlocking failures reaches M, where the prompt interface prompts a user to enter a preset operation, M is less than N, and N is a quantity of unlocking failures that triggers a security mode, obtaining, by the terminal, the preset operation triggered by the user, and presenting the lock screen interface.

15 Claims, 42 Drawing Sheets

(51) Int. Cl.
  *H04M 1/725* (2006.01)
  *H04M 1/673* (2006.01)
  *G06F 9/451* (2018.01)
  *G06F 21/32* (2013.01)

(52) U.S. Cl.
  CPC ......... *G06F 21/32* (2013.01); *G06K 9/00013* (2013.01); *H04M 2250/22* (2013.01)

(56) References Cited

U.S. PATENT DOCUMENTS

| | | |
|---|---|---|
| 9,294,864 B2 | 3/2016 | Chen et al. |
| 2003/0051138 A1 | 3/2003 | Maeda et al. |
| 2007/0017977 A1 | 1/2007 | Ueda |
| 2013/0082937 A1* | 4/2013 | Liu ................... G06F 3/03545 345/173 |
| 2013/0145458 A1* | 6/2013 | Cheng ................. H04M 1/673 726/19 |
| 2015/0033122 A1* | 1/2015 | Park ..................... G06F 3/0488 715/702 |
| 2015/0040243 A1 | 2/2015 | Mittal |
| 2015/0074615 A1* | 3/2015 | Han ..................... H04L 63/105 715/863 |
| 2019/0369799 A1* | 12/2019 | Jeon ..................... G06F 3/0445 |

FOREIGN PATENT DOCUMENTS

| | | |
|---|---|---|
| CN | 105447359 A | 3/2016 |
| CN | 106203048 A | 12/2016 |
| CN | 106874744 A | 6/2017 |
| KR | 20150014786 A | 2/2015 |

\* cited by examiner

LOCK SCREEN INTERFACE PROCESSING METHOD AND TERMINAL

CROSS-REFERENCE TO RELATED APPLICATIONS

This application is a U.S. National Stage of International Patent Application No. PCT/CN2017/092886 filed on Jul. 14, 2017, which is hereby incorporated by reference in its entirety.

TECHNICAL FIELD

This application relates to the field of terminal application, and in particular, to a lock screen interface processing method and a terminal.

BACKGROUND

As the mobile communications industry develops and people's living standards improve, smart terminal devices have become indispensable devices in people's daily lives, work, and study. Smart terminals are increasingly highly configured, and become a service platform for new media, e-commerce, and information, and an important hub for Internet resources, mobile network resources, and environmental interaction resources. Therefore, an increasing quantity of personal information is stored on a smart terminal, such as a call/SMS message record, a social network account and password, a third-party payment account and password, and a network bank account and password.

To protect personal information and privacy, avoid an unintentional operation, or save power, smart terminals generally have a screen lock function. Such a terminal automatically locks a screen when there is no operation on the terminal in a specified period. After the screen is locked, the screen needs to be unlocked if the terminal needs to be used again. Commonly used unlocking manners include password unlocking, pattern unlocking, and fingerprint unlocking. For example, for pattern unlocking, a user presets an unlocking pattern on a terminal; and after a screen of the terminal is locked, the user can unlock the screen of the terminal by entering the unlocking pattern on a lock screen interface, to enter a home screen or another interface of the terminal.

For security reasons, when a quantity of consecutive unlocking failures encountered by the user within a particular period reaches a preset value, the terminal enters a security mode, to be specific, carrying out a preset security policy. The preset security policy includes, for example, locking the terminal for S seconds, which means that the user cannot unlock the terminal within the next S seconds, and erasing data for the terminal and resetting the terminal to factory settings.

SUMMARY

Embodiments of this application provide a lock screen interface processing method, to improve user experience.

In view of this, a first aspect of this application provides a lock screen interface processing method. The method includes: when a terminal is in a screen locked state, presenting a lock screen interface on a screen; obtaining, by the terminal, a touch operation (that is, an unlocking operation) performed in the lock screen interface and/or a fingerprint recognition area; when determining, based on the operation, that a quantity of unlocking failures reaches M, presenting, by the terminal, a prompt interface, where the prompt interface is used to prompt a user to enter a preset operation; and when the user enters the preset operation in the prompt interface, obtaining, by the terminal, the preset operation, and presenting, by the terminal, the lock screen interface, where M is less than N, and N is a quantity of unlocking failures that triggers a security mode.

It should be noted that in this embodiment, the preset operation is an operation that requires particular input logic for implementation, which means that a particular law and rule of thinking are required for entering the operation, and the preset operation is an operation that can be implemented only by a conscious behavior generated through analysis. The fingerprint recognition area is an area capable of identifying fingerprint information.

In this embodiment of this application, when the quantity of unlocking failures reaches M, the terminal may display the prompt interface to prompt the user to enter the preset operation. The preset operation is an operation that requires particular input logic for implementation and is a confirming operation triggered by a conscious behavior of the user. Therefore, an accidental touch behavior generated by an object or in another situation cannot trigger the preset operation. This can prevent an accidental touch operation from triggering the security mode, and avoid the following problems: without consciousness of the user, the terminal is locked, data on the terminal is erased, the terminal is reset to factory settings, and the like. In this way, user experience is improved.

With reference to the first aspect of this application, in a first implementation of the first aspect of this application, after the presenting, by the terminal, a prompt interface, the following operations may be further performed:

obtaining, by the terminal, an operation different from the preset operation, and presenting the prompt interface. To be specific, the terminal closes the prompt interface only when the user of the terminal triggers the preset operation based on the prompt interface; if the user of the terminal does not trigger the preset operation, the terminal always presents the prompt interface or continues presenting the prompt interface.

With reference to the first aspect of this application, in a second implementation of the first aspect of this application, the unlocking operation obtained by the terminal includes at least one accidental touch operation, and the accidental touch operation is a touch operation in an accidental touch scenario.

In this embodiment of this application, the terminal presents the prompt interface only when obtaining at least one accidental touch operation, that is, the terminal does not present the prompt interface when the user normally unlocks the screen without an accidental touch operation. This prevents the prompt interface from affecting the normally unlocking user. In this way, user experience is improved.

With reference to the second implementation of the first aspect of this application, in a third implementation of the first aspect of this application, the lock screen interface presented by the terminal is a pattern unlocking interface; and the touch operation in the accidental touch scenario includes at least one of the following:

a touch operation that is performed in the pattern unlocking interface and whose touch duration is less than a first threshold;

a touch operation that is performed in the pattern unlocking interface and whose touch track length is less than a second threshold;

a touch operation that is performed in the pattern unlocking interface and that has more than one touch point; and a touch operation that is performed in the pattern unlocking interface and whose touch point coordinates include coordinates in an accidental touch area.

It should be understood that the pattern unlocking interface is an interface that requires the user to slide to unlock the screen, and the interface may include or may not include information prompting the user to slide to unlock the screen.

This embodiment of this application provides a plurality of methods for identifying the accidental touch operation, thereby improving flexibility of the solution.

With reference to the second implementation of the first aspect of this application, in a fourth implementation of the first aspect of this application, the lock screen interface presented by the terminal is a password unlocking interface; and the touch operation in the accidental touch scenario includes at least one of the following:

a touch operation that is performed in the password unlocking interface and whose touch duration is greater than a third threshold;

a touch operation that is performed in the password unlocking interface and whose touch track length is less than a third threshold;

a touch operation that is performed in the password unlocking interface and that has more than one touch point; and a touch operation that is performed in the password unlocking interface and whose touch point coordinates include coordinates in an accidental touch area.

It should be understood that the password unlocking interface is an interface that requires the user to use a password to unlock the screen, and the interface may include or may not include information prompting the user to enter the password.

This embodiment of this application provides a plurality of methods for identifying the accidental touch operation, thereby improving flexibility of the solution.

With reference to the second implementation of the first aspect of this application, in a fifth implementation of the first aspect of this application, the lock screen interface presented by the terminal is a password unlocking interface; and the touch operation in the accidental touch scenario includes at least one of the following:

a touch operation that is performed in a fingerprint recognition area and whose touch duration is greater than a fifth threshold; and a touch operation that has a touch point in a non-fingerprint-recognition area.

It should be understood that the fingerprint unlocking interface is an interface that requires the user to enter fingerprint information to unlock the screen, and the interface may include or may not include information prompting the user to enter a fingerprint.

This embodiment of this application provides a plurality of methods for identifying the accidental touch operation, thereby improving flexibility of the solution.

With reference to any one of the first aspect of this application, or the first to the fifth implementations of the first aspect, in a sixth implementation of the first aspect of this application, the preset operation is a sliding operation corresponding to preset sliding information, and the preset sliding information includes at least one of the following: a preset sliding start point, a preset sliding end point, a preset sliding track, preset sliding duration, and a preset sliding length. In other words, the prompt interface is used to prompt the user to enter the sliding operation corresponding to the preset sliding information, the preset operation entered by the user is the sliding operation, and the sliding operation is corresponding to at least one of the following types of sliding information: the preset sliding start point, the preset sliding end point, the preset sliding track, the preset sliding duration, and the preset sliding length.

This embodiment of this application provides a specific presentation manner of the prompt interface, thereby improving implementability of the solution.

With reference to any one of the first aspect of this application, or the first to the fifth implementations of the first aspect, in a seventh implementation of the first aspect of this application, the preset operation is a tap operation corresponding to preset tap information, and the preset tap information includes at least one of the following: a preset tap position, preset tap duration, and a preset tap order. In other words, the prompt interface is used to prompt the user to enter a tap corresponding to preset sliding information, the preset operation entered by the user is the tap operation, and the tap operation is corresponding to at least one of the following types of sliding information: a preset sliding start point, a preset sliding end point, a preset sliding track, preset sliding duration, and a preset sliding length.

This embodiment of this application provides another specific presentation manner of the prompt interface, thereby improving flexibility of the solution.

With reference to any one of the first aspect of this application, or the first to the fifth implementations of the first aspect, in an eighth implementation of the first aspect of this application, the preset operation is sliding a specific element to a preset position. In other words, the preset operation entered by the user is sliding the specific element to the preset position.

This embodiment of this application provides another specific presentation manner of the prompt interface, thereby improving flexibility of the solution.

With reference to any one of the first aspect of this application, or the first to the fifth implementations of the first aspect, in a ninth implementation of the first aspect of this application, the prompt interface may specifically prompt the user to slide along any track from a pressing point in the prompt interface; or prompt the user to slide along a specific track from a pressing point in the prompt interface; or prompt the user to slide, in an order indicated by arrows, from a first pressing point to a second pressing point and then to a third pressing point; or prompt the user to draw a specific figure; or prompt the user to draw a specific figure including a specific element displayed in the prompt interface; or prompt the user to drag a slider to a specific position; or prompt the user to drag a character that matches a formula displayed in the prompt interface, to a specific position; or prompt the user to simultaneously touch a plurality of touch points in the prompt interface; or prompt the user to tap a specific dynamically moving element in the prompt interface; or prompt the user to select a specific element from a plurality of elements in the prompt interface; or prompt the user to press a specific position in the prompt interface for preset duration; or prompt the user to tap a lighted area in the prompt interface; or prompt the user to enter a specific character; or prompt the user to shake the terminal to make a specific element in the prompt interface move to a specific position in the prompt interface.

This embodiment of this application provides a plurality of specific presentation manners of the prompt interface, thereby improving flexibility of the solution.

With reference to any one of the first aspect of this application, or the first to the ninth implementations of the first aspect, in a tenth implementation of the first aspect of this application, when the quantity of unlocking failures reaches M, the terminal further gives an alert when presenting the prompt interface.

In this embodiment of this application, the terminal may give the alert, to indicate that the quantity of unlocking failures of the terminal reaches N. Therefore, in an accidental touch scenario, the user can know, in a timely manner, that an accidental touch causes an unlocking failure, so that the user can prevent, in a timely manner, an accidental touch operation performed in the accidental touch scenario. This prevents problems such as terminal locking and data erasing caused by the accidental touch operation. In this way, user experience is improved.

With reference to the tenth implementation of the first aspect of this application, in an eleventh implementation of the first aspect of this application, the alert may include at least one of the following: ringing, vibration, light flashing, screen-on, and a voice alert.

This application provides a plurality of alert manners, thereby improving flexibility of the solution.

A second aspect of this application provides a lock screen interface processing method. The method includes:

when a terminal is in a screen locked state, presenting a lock screen interface on a screen; obtaining, by the terminal, a touch operation, that is, an unlocking operation, performed in the lock screen interface and/or a fingerprint recognition area; when the terminal determines, based on the obtained unlocking operation, that a quantity of unlocking failures reaches M, giving, by the terminal, an alert; and when a user enters, on the terminal, an operation that triggers a stop instruction, obtaining, by the terminal, the stop instruction, and stopping the alert.

It should be noted that in this embodiment, the fingerprint recognition area is an area capable of identifying fingerprint information.

It should be further noted that in this embodiment, the alert given by the terminal continues until the terminal obtains the stop instruction.

In this embodiment of this application, when the quantity of unlocking failures reaches M, the terminal may give the alert, to indicate that the quantity of unlocking failures of the terminal reaches N. Therefore, in an accidental touch scenario, the user can know, in a timely manner, that an accidental touch causes an unlocking failure.

With reference to the second aspect of this application, in a first implementation of the second aspect of this application, when the quantity of unlocking failures reaches M, the terminal may further display a prompt interface when giving the alert, where the prompt interface is used to prompt the user to enter a preset operation, and the preset operation is the operation that triggers the stop instruction.

In this application, when the quantity of unlocking failures reaches M, the terminal may further display the prompt interface when giving the alert, thereby preventing a further accidental touch operation in an accidental touch environment.

With reference to the first or the second implementation of the second aspect of this application, in a third implementation of the second aspect of this application, the alert may include at least one of the following: ringing, vibration, light flashing, screen-on, and a voice alert.

This application provides a plurality of alert manners, thereby improving flexibility of the solution.

With reference to any one of the second aspect of the embodiments of this application, or the first to the third implementations of the second aspect, in a fourth implementation of the second aspect of this application, the unlocking operation obtained by the terminal includes at least one unintentional operation, and the accidental touch operation is a touch operation in an accidental touch scenario.

In this embodiment of this application, the terminal presents the prompt interface only when obtaining at least one accidental touch operation, that is, no alert is given when the user normally unlocks the screen without an accidental touch operation. This prevents the prompt interface from affecting the normally unlocking user. In this way, user experience is improved.

With reference to the fourth implementation of the second aspect of this application, in a fifth implementation of the second aspect of this application, the lock screen interface presented by the terminal is a pattern unlocking interface; and the unlocking operation in the accidental touch scenario includes at least one of the following:

a touch operation that is performed in the pattern unlocking interface and whose touch duration is less than a first threshold;

a touch operation that is performed in the pattern unlocking interface and whose touch track length is less than a second threshold;

a touch operation that is performed in the pattern unlocking interface and that has more than one touch point; and a touch operation that is performed in the pattern unlocking interface and whose touch point coordinates include coordinates in an accidental touch area.

It should be understood that the pattern unlocking interface is an interface that requires the user to slide to unlock the screen, and the interface may include or may not include information prompting the user to slide to unlock the screen.

This embodiment of this application provides a plurality of methods for identifying the accidental touch operation, thereby improving flexibility of the solution.

With reference to the fourth implementation of the second aspect of this application, in a sixth implementation of the second aspect of this application, the lock screen interface presented by the terminal is a password unlocking interface; and the touch operation in the accidental touch scenario includes at least one of the following:

a touch operation that is performed in the password unlocking interface and whose touch duration is greater than a third threshold;

a touch operation that is performed in the password unlocking interface and whose touch track length is less than a third threshold;

a touch operation that is performed in the password unlocking interface and that has more than one touch point; and a touch operation that is performed in the password unlocking interface and whose touch point coordinates include coordinates in an accidental touch area.

It should be understood that the password unlocking interface is an interface that requires the user to use a password to unlock the screen, and the interface may include or may not include information prompting the user to enter the password.

This embodiment of this application provides a plurality of methods for identifying the accidental touch operation, thereby improving flexibility of the solution.

With reference to the fourth implementation of the second aspect of this application, in a seventh implementation of the second aspect of this application, the lock screen interface presented by the terminal is a password unlocking interface; and the touch operation in the accidental touch scenario includes at least one of the following:

a touch operation that is performed in a fingerprint recognition area and whose touch duration is greater than a fifth threshold; and a touch operation that has a touch point in a non-fingerprint-recognition area.

It should be understood that the fingerprint unlocking interface is an interface that requires the user to enter fingerprint information to unlock the screen, and the interface may include or may not include information prompting the user to enter a fingerprint.

This embodiment of this application provides a plurality of methods for identifying the accidental touch operation, thereby improving flexibility of the solution.

A third aspect of this application provides another lock screen interface processing method. The method includes:

when a terminal is in a screen locked state, presenting a lock screen interface; obtaining, by the terminal, a touch operation performed in the lock screen interface and/or a fingerprint recognition area; determining, by the terminal based on the touch operation, whether the terminal is in an accidental touch scenario; and when the terminal is in the accidental touch scenario, performing, by the terminal, an operation related to a security mode.

It should be understood that the accidental touch scenario is a scenario in which an unintentional unlocking operation easily occurs, the unintentional unlocking operation is a touch operation not intended to unlock the terminal, and the operation related to the security mode is used to reduce impact of the touch operation in the accidental touch scenario on the security mode.

In this embodiment of this application, the terminal identifies the touch operation performed in the lock screen interface and/or the fingerprint input area, to determine a touch operation that is an unintentional operation, thereby providing a basis for the terminal to determine a current scenario of the terminal, and determining whether the terminal needs to enter the security mode. This can avoid the following problems: without consciousness of a user, the terminal is locked, data on the terminal is erased, the terminal is reset to factory settings, and the like. In this way, user experience is improved.

With reference to the third aspect of this application, in a first implementation of the third aspect of this application, the performing, by the terminal, an operation related to a security mode is specifically: skipping responding to the touch operation; or ignoring an unlocking failure caused by the touch operation; or increasing a quantity of unlocking failures that triggers the security mode; or reducing locking duration in the security mode corresponding to the touch operation; or enabling an anti-accidental-touch mode; or displaying a prompt interface used to prompt the user to enter a preset operation; or giving an alert.

It should be noted that the ignoring an unlocking failure caused by the touch operation means that this unlocking failure is not added as a statistical sample to a quantity of consecutive unlocking failures.

The locking duration in the security mode is a time length for which the terminal is locked after the terminal enters the security mode.

The anti-accidental-touch mode is used to prevent an unintentional operation on the terminal, and may be specifically: displaying an inoperable interface on a screen or blocking all operations performed in an interface.

The alert given by the terminal may include at least one of the following: ringing, vibration, a voice alert, screen-on, light flashing, and music.

In this embodiment of this application, when the terminal is in the accidental touch scenario, a plurality of measures may be taken to reduce impact of the touch operation on the security mode, thereby improving flexibility of the solution.

With reference to the third aspect of this application or the first implementation of the third aspect, in a second implementation of the third aspect of this application, the lock screen interface is a pattern unlocking interface; and a process of determining, by the terminal based on the touch operation, that the terminal is in the accidental touch scenario may specifically include the following step:

the terminal determines that touch duration corresponding to the touch operation is less than a first threshold; or the terminal determines that a touch track length corresponding to the touch operation is less than a second threshold; or the terminal determines that a quantity of touch points corresponding to the touch operation is greater than 1; or the terminal determines that touch point coordinates corresponding to the touch operation include coordinates in an accidental touch area.

It should be noted that the accidental touch area is an area excluding an unlocking sensing key. The area may be delimited, or may be automatically identified by the terminal.

This application provides a plurality of manners of determining that the terminal is in the accidental touch scenario, thereby improving flexibility of the solution.

With reference to the third aspect of this application or the first implementation of the third aspect, in a third implementation of the third aspect of this application, the lock screen interface is a password unlocking interface; and a process of determining, by the terminal based on the touch operation, that the terminal is in the accidental touch scenario may specifically include the following step:

the terminal determines that touch duration corresponding to the touch operation is greater than a third threshold; or the terminal determines that a touch track length corresponding to the touch operation is greater than a fourth threshold; or the terminal determines that a quantity of touch points corresponding to the touch operation is greater than 1; or the terminal determines that touch point coordinates corresponding to the touch operation include coordinates in an accidental touch area.

This application provides a plurality of manners of determining that the terminal is in the accidental touch scenario, thereby improving flexibility of the solution.

With reference to the third aspect of this application or the first implementation of the third aspect, in a fourth implementation of the third aspect of this application, the lock screen interface is a fingerprint unlocking interface; and a process of determining, by the terminal based on the touch operation, that the terminal is in the accidental touch scenario may specifically include the following step:

determining that touch duration of the touch operation is greater than a fifth threshold; or determining that a touch point corresponding to the touch operation includes a touch point in a non-fingerprint-recognition area.

This application provides a plurality of manners of determining that the terminal is in the accidental touch scenario, thereby improving flexibility of the solution.

A fourth aspect of this application provides a terminal. The terminal includes:

a display module, configured to present a lock screen interface; and an obtaining module, configured to obtain an unlocking operation, where the unlocking operation includes at least one of an operation performed in the lock screen interface and an operation performed in a fingerprint recognition area, where the display module is further configured to: when a quantity of unlocking failures reaches M, present a prompt interface, where the prompt interface is used to prompt a user to enter a preset operation, M is less than N, and N is a quantity of unlocking failures that triggers a security mode;

the obtaining module is further configured to obtain the preset operation triggered by the user; and the display module is further configured to: when the obtaining module obtains the preset operation, present the lock screen interface.

With reference to the fourth aspect of this application, in a first implementation of the fourth aspect of this application, the obtaining module is further configured to obtain an operation different from the preset operation; and the display module is further configured to present the prompt interface.

With reference to the fourth aspect of this application, in a second implementation of the fourth aspect of this application, the unlocking operation includes at least one accidental touch operation, and the accidental touch operation is a touch operation in an accidental touch scenario.

With reference to the second implementation of the fourth aspect of this application, in a third implementation of the fourth aspect of this application, the lock screen interface is a pattern unlocking interface; and the touch operation in the accidental touch scenario includes at least one of the following:

a touch operation that is performed in the pattern unlocking interface and whose touch duration is less than a first threshold;

a touch operation that is performed in the pattern unlocking interface and whose touch track length is less than a second threshold;

a touch operation that is performed in the pattern unlocking interface and that has more than one touch point; and a touch operation that is performed in the pattern unlocking interface and whose touch point coordinates include coordinates in an accidental touch area.

With reference to the second implementation of the fourth aspect of this application, in a fourth implementation of the fourth aspect of this application, the lock screen interface is a password unlocking interface; and the touch operation in the accidental touch scenario includes at least one of the following:

a touch operation that is performed in the password unlocking interface and whose touch duration is greater than a third threshold;

a touch operation that is performed in the password unlocking interface and whose touch track length is less than a third threshold;

a touch operation that is performed in the password unlocking interface and that has more than one touch point; and a touch operation that is performed in the password unlocking interface and whose touch point coordinates include coordinates in an accidental touch area.

With reference to the second implementation of the fourth aspect of this application, in a fifth implementation of the fourth aspect of this application, the lock screen interface is a fingerprint unlocking interface; and the touch operation in the accidental touch scenario includes at least one of the following:

a touch operation that is performed in a fingerprint recognition area and whose touch duration is greater than a fifth threshold, and a touch operation that has a touch point in a non-fingerprint-recognition area.

With reference to any one of the fourth aspect of this application, or the first to the fifth implementations of the fourth aspect of this application, in a sixth implementation of the fourth aspect of this application, the preset operation is a sliding operation corresponding to preset sliding information, and the preset sliding information includes at least one of the following: a preset sliding start point, a preset sliding end point, a preset sliding track, preset sliding duration, and a preset sliding length.

With reference to any one of the fourth aspect of this application, or the first to the fifth implementations of the fourth aspect of this application, in a seventh implementation of the fourth aspect of this application, the preset operation is a tap operation corresponding to preset tap information, and the preset tap information includes at least one of the following: a preset tap position, preset tap duration, and a preset tap order.

With reference to any one of the fourth aspect of this application, or the first to the fifth implementations of the fourth aspect of this application, in an eighth implementation of the fourth aspect of this application, the preset operation is sliding a specific element to a preset position.

With reference to any one of the fourth aspect of this application, or the first to the fifth implementations of the fourth aspect of this application, in a ninth implementation of the fourth aspect of this application, the prompt interface is used to prompt the user to slide along any track from a pressing point in the prompt interface; or the prompt interface is used to prompt the user to slide along a specific track from a pressing point in the prompt interface; or the prompt interface is used to prompt the user to slide, in an order indicated by arrows, from a first pressing point to a second pressing point and then to a third pressing point; or the prompt interface is used to prompt the user to draw a specific figure; or the prompt interface is used to prompt the user to draw a specific figure including a specific element displayed in the prompt interface; or the prompt interface is used to prompt the user to drag a slider to a specific position; or the prompt interface is used to prompt the user to drag a character that matches a formula displayed in the prompt interface, to a specific position; or the prompt interface is used to prompt the user to simultaneously touch a plurality of touch points in the prompt interface; or the prompt interface is used to prompt the user to tap a specific dynamically moving element in the prompt interface; or the prompt interface is used to prompt the user to select a specific element from a plurality of elements in the prompt interface; or the prompt interface is used to prompt the user to press a specific position in the prompt interface for preset duration; or the prompt interface is used to prompt the user to tap a lighted area in the prompt interface; or the prompt interface is used to prompt the user to enter a specific character; or the prompt interface is used to prompt the user to shake the terminal to make a specific element in the prompt interface move to a specific position in the prompt interface.

With reference to any one of the fourth aspect of this application, or the first to the fifth implementations of the fourth aspect of this application, in a tenth implementation of the fourth aspect of this application, the terminal further includes:

an alert module, configured to: when the quantity of unlocking failures reaches M, give an alert; and a stop module, configured to stop the alert.

With reference to the tenth implementation of the fourth aspect of this application, in an eleventh implementation of the fourth aspect of this application, the alert includes at least one of the following: ringing, vibration light flashing, screen-on a voice alert, and music.

A fifth aspect of this application provides a terminal. The terminal includes:

a display module, configured to present a lock screen interface;

an obtaining module, configured to obtain an unlocking operation, where the unlocking operation includes at least one of an operation performed in the lock screen interface and an operation performed in a fingerprint recognition area;

an alert module, configured to: when a quantity of unlocking failures reaches M, give an alert, where the obtaining module is further configured to obtain a stop instruction entered by a user; and a stop module, configured to: when the obtaining module obtains the stop instruction, stop the alert.

With reference to the fifth aspect of this application, in a first implementation of the fifth aspect of this application, the display module is further configured to: when the quantity of unlocking failures reaches M, display a prompt interface, where the prompt interface is used to prompt the user to enter a preset operation; and the stop instruction is an instruction triggered by the preset operation.

With reference to the fifth aspect of this application or the first implementation of the fifth aspect, in a second implementation of the fifth aspect of this application, the alert includes at least one of the following: ringing, vibration, light flashing, screen-on, a voice alert, and music.

A sixth aspect of this application provides a terminal. The terminal includes:

a display module, configured for the terminal to display a lock screen interface;

an obtaining module, configured to obtain a touch operation, where the touch operation includes at least one of an operation performed in the lock screen interface and an operation performed in a fingerprint recognition area;

a determining module, configured to determine, based on the touch operation, that the terminal is in an accidental touch scenario; and a processing module, configured to: when the determining module determines, based on the touch operation, that the terminal is in the accidental touch scenario, perform an operation related to a security mode.

With reference to the sixth aspect of this application, in a first implementation of the sixth aspect of this application, the processing module is specifically configured to:

skip responding to the touch operation; or ignore an unlocking failure caused by the touch operation; or increase a security trigger quantity, where the security trigger quantity is a quantity of unlocking failures that triggers the security mode; or decrease locking duration in the security mode corresponding to the touch operation; or enable an anti-accidental-touch mode; or display a prompt interface, where the prompt interface is used to prompt a user to enter a preset operation; or give an alert, where the alert includes at least one of the following: ringing, vibration, light flashing, screen-on, a voice alert, and music.

With reference to the sixth aspect of this application or the first implementation of the sixth aspect, in a second implementation of the sixth aspect of this application, the lock screen interface is a pattern unlocking interface; and the determining module is specifically configured to:

determine that touch duration corresponding to the touch operation is less than a first threshold; or determine that a touch track length corresponding to the touch operation is less than a second threshold; or determine that a quantity of touch points corresponding to the touch operation is greater than 1; or determine that touch point coordinates corresponding to the touch operation include coordinates in an accidental touch area.

With reference to the sixth aspect of this application or the first implementation of the sixth aspect, in a third implementation of the sixth aspect of this application, the lock screen interface is a password unlocking interface; and the determining module is specifically configured to:

determine that touch duration corresponding to the touch operation is greater than a third threshold; or determine that a touch track length corresponding to the touch operation is greater than a fourth threshold; or determine that a quantity of touch points corresponding to the touch operation is greater than 1; or determine that touch point coordinates corresponding to the touch operation include coordinates in an accidental touch area.

With reference to the sixth aspect of this application or the first implementation of the sixth aspect, in a third implementation of the sixth aspect of this application, the lock screen interface is a fingerprint unlocking interface; and the determining module is specifically configured to:

determine that touch duration of the touch operation is greater than a fifth threshold; or determine that a touch point corresponding to the touch operation includes a touch point in a non-fingerprint-recognition area.

A seventh aspect of this application provides a terminal. The terminal includes a processor, a memory, and a display;

the memory is configured to store a program; and the processor is configured to execute the program, specifically including the following steps:

controlling the display to present a lock screen interface;

obtaining an unlocking operation, where the unlocking operation includes at least one of an operation performed in the lock screen interface and an operation performed in a fingerprint recognition area;

if a quantity of unlocking failures reaches M, controlling the display to present a prompt interface, where the prompt interface is used to prompt a user to enter a preset operation, M is less than N, and N is a quantity of unlocking failures that triggers a security mode; and obtaining the preset operation triggered by the user, and controlling the display to present the lock screen interface.

With reference to the seventh aspect of this application, in a first implementation of the seventh aspect of this application, the processor further performs the following step:

obtaining an operation different from the preset operation, and presenting the prompt interface.

With reference to the seventh aspect of this application, in a second implementation of the seventh aspect of this application, the unlocking operation includes at least one accidental touch operation, and the accidental touch operation is a touch operation in an accidental touch scenario.

With reference to the second implementation of the seventh aspect of this application, in a third implementation of the seventh aspect of this application, the lock screen interface is a pattern unlocking interface; and the touch operation in the accidental touch scenario includes at least one of the following:

a touch operation that is performed in the pattern unlocking interface and whose touch duration is less than a first threshold;

a touch operation that is performed in the pattern unlocking interface and whose touch track length is less than a second threshold;

a touch operation that is performed in the pattern unlocking interface and that has more than one touch point; and a touch operation that is performed in the pattern unlocking interface and whose touch point coordinates include coordinates in an accidental touch area.

With reference to the second implementation of the seventh aspect of this application, in a fourth implementation of the seventh aspect of this application, the lock screen interface is a password unlocking interface; and the touch operation in the accidental touch scenario includes at least one of the following:

a touch operation that is performed in the password unlocking interface and whose touch duration is greater than a third threshold;

a touch operation that is performed in the password unlocking interface and whose touch track length is less than a third threshold;

a touch operation that is performed in the password unlocking interface and that has more than one touch point; and a touch operation that is performed in the password unlocking interface and whose touch point coordinates include coordinates in an accidental touch area.

With reference to the second implementation of the seventh aspect of this application, in a fifth implementation of the seventh aspect of this application, the lock screen interface is a fingerprint unlocking interface; and the touch operation in the accidental touch scenario includes at least one of the following:

a touch operation that is performed in a fingerprint recognition area and whose touch duration is greater than a fifth threshold; and a touch operation that has a touch point in a non-fingerprint-recognition area.

With reference to any one of the seventh aspect of this application, or the first to the fifth implementations of the seventh aspect, in a sixth implementation of the seventh aspect of this application, the preset operation is a sliding operation corresponding to preset sliding information, and the preset sliding information includes at least one of the following: a preset sliding start point, a preset sliding end point, a preset sliding track, preset sliding duration, and a preset sliding length.

With reference to any one of the seventh aspect of this application, or the first to the fifth implementations of the seventh aspect, in a seventh implementation of the seventh aspect of this application, the preset operation is a tap operation corresponding to preset tap information, and the preset tap information includes at least one of the following: a preset tap position, preset tap duration, and a preset tap order.

With reference to any one of the seventh aspect of this application, or the first to the fifth implementations of the seventh aspect, in an eighth implementation of the seventh aspect of this application, the preset operation is sliding a specific element to a preset position.

With reference to any one of the seventh aspect of this application, or the first to the eighth implementations of the seventh aspect, in a ninth implementation of the seventh aspect of this application, the processor specifically further performs the following steps:

if the quantity of unlocking failures reaches M, giving, by the terminal, an alert; and after obtaining the preset operation that is triggered by the user based on the prompt interface, stopping the alert.

An eighth aspect of this application provides a terminal. The terminal includes a processor, a memory, and a display:

the memory is configured to store a program; and the processor is configured to execute the program, specifically including the following steps:

controlling the display to present a lock screen interface;

obtaining an unlocking operation, where the unlocking operation includes at least one of an operation performed in the lock screen interface and an operation performed in a fingerprint recognition area;

if a quantity of unlocking failures reaches M, giving an alert; and obtaining a stop instruction entered by a user, and stopping the alert.

With reference to the eighth aspect of this application, in a first implementation of the eighth aspect of this application, the processor further performs the following step:

if the quantity of unlocking failures reaches M, displaying a prompt interface, where the prompt interface is used to prompt the user to enter a preset operation; and the stop instruction is an instruction triggered by the preset operation.

With reference to the eighth aspect of this application or the first implementation of the eighth aspect, the alert includes at least one of the following: ringing, vibration, light flashing, screen-on, a voice alert, and music.

A ninth aspect of this application provides a terminal. The terminal includes a processor, a memory, and a display;

the memory is configured to store a program; and the processor is configured to execute the program, specifically including the following steps:

controlling the display to display a lock screen interface;

obtaining a touch operation, where the touch operation includes at least one of an operation performed in the lock screen interface and an operation performed in a fingerprint recognition area; and if determining, based on the touch operation, that the terminal is in an accidental touch scenario, performing an operation related to a security mode.

With reference to the ninth aspect of this application, in a first implementation of the ninth aspect of this application, the processor specifically performs the following step:

skipping responding to the touch operation; or ignoring an unlocking failure caused by the touch operation; or increasing a security trigger quantity, where the security trigger quantity is a quantity of unlocking failures that triggers the security mode; or decreasing locking duration in the security mode corresponding to the touch operation; or enabling an anti-accidental-touch mode; or displaying a prompt interface, where the prompt interface is used to prompt a user to enter a preset operation; or giving an alert, where the alert includes at least one of the following: ringing, vibration, light flashing, screen-on, a voice alert, and music.

With reference to the ninth aspect of this application or the first implementation of the ninth aspect, in a second implementation of the ninth aspect of this application, the lock screen interface is a pattern unlocking interface; and the processor specifically performs the following step:

determining that touch duration corresponding to the touch operation is less than a first threshold; or determining that a touch track length corresponding to the touch operation is less than a second threshold; or determining that a quantity of touch points corresponding to the touch operation is greater than 1; or determining that touch point coordinates corresponding to the touch operation include coordinates in an accidental touch area.

With reference to the ninth aspect of this application or the first implementation of the ninth aspect, in a third implementation of the ninth aspect of this application, the lock screen interface is a password unlocking interface; and the processor specifically performs the following step:

determining that touch duration corresponding to the touch operation is greater than a third threshold; or determining that a touch track length corresponding to the touch operation is greater than a fourth threshold; or determining that a quantity of touch points corresponding to the touch operation is greater than 1; or determining that touch point coordinates corresponding to the touch operation include coordinates in an accidental touch area.

With reference to the ninth aspect of this application or the first implementation of the ninth aspect, in a fourth implementation of the ninth aspect of this application, the lock screen interface is a fingerprint unlocking interface; and the processor specifically performs the following step:

determining that touch duration of the touch operation is greater than a fifth threshold; or determining that a touch point corresponding to the touch operation includes a touch point in a non-fingerprint-recognition area.

A tenth aspect of this application provides a computer readable storage medium, including an instruction. When the instruction is run on a computer, the computer is enabled to perform the method according to any one of the first aspect, or the first to the tenth implementations of the first aspect.

An eleventh aspect of this application provides a computer readable storage medium, including an instruction. When the instruction is run on a computer, the computer is enabled to perform the method according to any one of the second aspect, or the first to the seventh implementations of the second aspect.

A twelfth aspect of this application provides a computer readable storage medium, including an instruction. When the instruction is run on a computer, the computer is enabled to perform the method according to any one of the third aspect, or the first to the fourth implementations of the third aspect.

A thirteenth aspect of this application provides a computer program product. When the computer program product is run on a computer, the computer is enabled to perform the method according to any one of the first aspect, or the first to the tenth implementations of the first aspect.

A fourteenth aspect of this application provides a computer program product. When the computer program product is run on a computer, the computer is enabled to perform the method according to any one of the second aspect, or the first to the seventh implementations of the second aspect.

A fifteenth aspect of this application provides a computer program product. When the computer program product is run on a computer, the computer is enabled to perform the method according to any one of the third aspect, or the first to the fourth implementations of the third aspect.

It can be learned from the foregoing technical solutions that the embodiments of this application have the following advantages:

In the embodiments of this application, when the quantity of unlocking failures reaches M, the terminal may display the prompt interface to prompt the user to enter the preset operation. The preset operation is an operation that requires particular input logic for implementation and is a confirming operation triggered by a conscious behavior of the user. Therefore, an accidental touch behavior generated by an object or in another situation cannot enter the preset operation. This can prevent an accidental touch operation from triggering the security mode, and avoid the following problems: without consciousness of the user, the terminal is locked, data on the terminal is erased, the terminal is reset to factory settings, and the like. In this way, user experience is improved.

DESCRIPTION OF EMBODIMENTS

Figure 1:
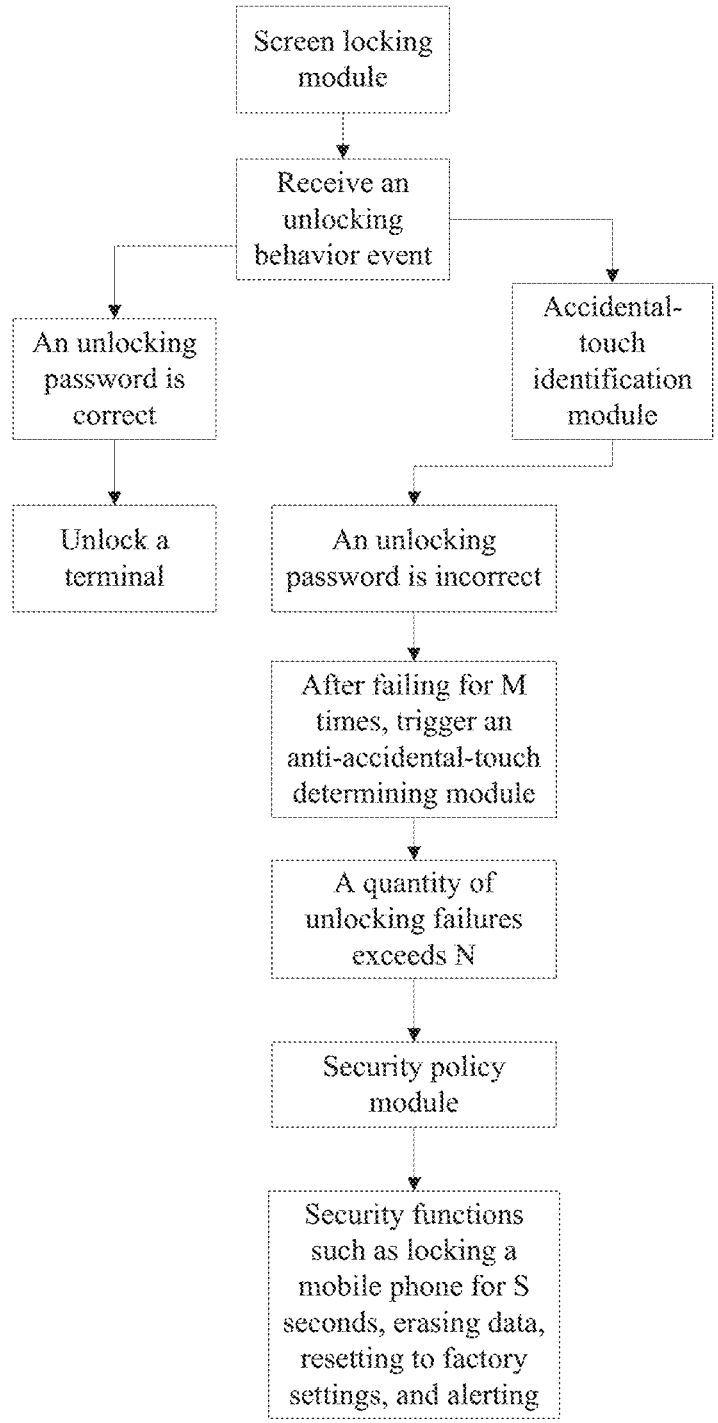
FIG. 1 is a flowchart of unlocking according to an embodiment of this application.

The following describes technical solutions in the embodiments of this application with reference to accompanying drawings in the embodiments of this application. Apparently, the described embodiments are merely some rather than all of the embodiments of this application.

In the specification, claims, and accompanying drawings of this application, the terms "first", "second", "third", "fourth", and so on (if any) are intended to distinguish between similar objects but do not necessarily indicate a specific order or sequence. It should be understood that data used in such a way may be interchanged in proper circumstances, so that the embodiments described herein can be implemented in other orders than the order illustrated or described herein. Moreover, the terms "include" and "contain" and any variants thereof intend to cover non-exclusive inclusion, for example, a process, method, system, product, or device that includes a series of steps or units is not necessarily limited to those steps or units expressly listed, but may include other steps or units that are not expressly listed or that are inherent to such a process, method, product, or device.

A security mode ensures information security, but also troubles a user to some extent. An unconscious behavioral touch of a user that happens, for example, when a terminal is in a backpack or a pocket or when a baby is unintendedly playing with a terminal may generate some touch operations on the terminal, and these touch operations may trigger an unlocking behavior for a plurality of times, and consequently trigger carrying out of a security policy. This troubles the user. For example, the terminal is locked for S seconds, and as a result, the user cannot unlock the terminal for normal use in a specific period. For another example, data on the terminal is erased, and as a result, the user loses important data. User experience is greatly degraded.

In view of the foregoing situation, the embodiments of this application provide a lock screen interface processing method and a terminal, to prevent a data loss caused by an accidental touch and improve user experience.

To facilitate understanding of the embodiments of this application, the following defines some terms in the embodiments of this application.

Lock screen interface: An interface displayed when a terminal is in a screen locked state is a lock screen interface. A user needs to enter a correct unlocking instruction in the lock screen interface in a preset unlocking manner, to unlock the terminal, that is, to release the terminal from the screen locked state. Therefore, the lock screen interface may also be referred to as an unlocking interface. For different unlocking manners, lock screen interfaces displayed by the terminal are also different. A lock screen interface in the embodiments of this application includes a lock screen interface corresponding to at least one unlocking manner.

Accidental touch scenario: In this application, an accidental touch scenario is a scenario in which an unintentional unlocking operation easily occurs. The unintentional unlocking operation is a touch operation not intended to unlock a terminal. The scenario may be specifically a scenario in which an accidental touch easily occurs, for example, when the terminal is in a backpack, the terminal is in a pocket, a screen of the terminal is covered by an object, or a baby aimlessly touches the terminal playfully.

Operation related to a security mode: An operation related to a security mode is an operation that can reduce impact of a touch operation on the security mode, for example, modifying a trigger rule of the security mode, modifying a security policy corresponding to the security mode, or limiting the touch operation.

Anti-accidental-touch mode: An anti-accidental-touch mode is used to prevent an unintentional operation on a terminal. Specifically, a specific interface may be displayed on a screen, and a user cannot perform any operations in the interface, that is, all operations performed in the interface are blocked. The terminal exits the mode only when receiving a specific operation (for example, pressing a power button) of the user or determining that the terminal is in a non-accidental touch environment (for example, determining that proximity light in the screen is not blocked).

Unlocking operation: An unlocking operation is a touch operation that is detected by a terminal and that is used to unlock the terminal.

Preset operation: A preset operation is an operation that requires particular input logic for implementation, where the input logic is a law and rule of thinking for entering. That is, the preset operation is an operation that needs to be implemented by a conscious behavior generated by a user through analysis, for example, entering an answer to a displayed math problem, dragging a displayed slider to a specific position, or drawing a specific figure, and is an operation that cannot be implemented in an accidental touch scenario in which, for example, a plurality of displayed touch points are touched simultaneously.

Fingerprint recognition area: A fingerprint recognition area is an area capable of identifying fingerprint information. The area is usually located in a HOME button area of a terminal, or in a specific recognition area on the back of a terminal, or in another specific area. This is not specifically limited in this application.

Touch point: A touch point is a point of contact between a target object entering a touch operation and a touch sensing area (for example, a screen or a fingerprint recognition area). The point of contact changes as the target object moves on the screen, that is, coordinates corresponding to the touch point change as the target object moves on the screen. The target object may be a part of a user such as a finger or an elbow, or may be an object such as a stylus or a glove.

Security mode: After entering a screen locked state, a terminal collects statistics on a quantity of consecutive unlocking failures. When the quantity of consecutive unlocking failures reaches a preset quantity, the terminal performs some security processing operations (to be specific, carrying out a corresponding security policy). In this case, the terminal is considered to have entered a security mode. For ease of description, in the embodiments of this application, the quantity of consecutive unlocking failures that is obtained through statistics collection is referred to as a quantity of consecutive unlocking failures, and the preset quantity is referred to as a security trigger quantity. In the embodiments of this application, the security processing operations may specifically include: locking the terminal for a period of time, so that a user cannot perform any unlocking operation; erasing data on the terminal: resetting the terminal to factory settings; or another operation. This is not specifically limited in this application.

To facilitate understanding of the embodiments of this application, the following describes a principle and a design idea of the embodiments of this application; In an existing unlocking procedure, after N consecutive unlocking failures (within a period T) (to be specific, a quantity of consecutive unlocking failures reaches a security trigger quantity), a security policy module of a terminal is triggered, to perform one or more security processing operations such as locking the terminal for S seconds, erasing data, resetting the terminal to factory settings, and alerting.

However, in this application, an anti-accidental-touch determining module and an accidental-touch identification module are added, as shown in FIG. 1.

The accidental-touch identification module is configured to: identify whether a current unlocking behavior is an accidental touch behavior or an intentional behavior of a user, to determine whether a current scenario of a terminal is an accidental touch scenario; and when determining that the current unlocking behavior is an accidental touch behavior (that is, determining that the current scenario is an accidental touch scenario), perform a related operation to reduce impact of the accidental touch behavior on a security mode. The operation performed by the accidental-touch identification module may be performed after an unlocking behavior event or during an unlocking behavior event.

The anti-accidental-touch determining module is configured to prevent the security policy module from being triggered by an unintentional behavior of a user caused by an accidental touch. The anti-accidental-touch determining module is triggered when the quantity of consecutive unlocking failures reaches the security trigger quantity, and an operation performed by the anti-accidental-touch determining module is performed before the security policy module performs the security processing operation.

In an unlocking procedure shown in FIG. 1, the terminal enters a screen locked state by using a screen locking module and displays a lock screen interface. When an unlocking behavior event is received (for example, a touch operation is obtained), if an instruction triggered by the unlocking behavior event matches a correct unlocking instruction (that is, an unlocking password is correct), the terminal is successfully unlocked, and the terminal displays a home screen or another non-lock-screen interface; if an instruction triggered by the unlocking behavior event does not match a correct unlocking instruction (that is, an unlocking password is incorrect), the accidental-touch identification module is triggered to identify an unintentional operation and count a quantity of unlocking failures. When the quantity of unlocking failures reaches M, the anti-accidental-touch determining module is triggered. When the quantity of unlocking failures reaches N, the security policy module is triggered.

It should be understood that the lock screen interface processing method in the embodiments of this application may be implemented based on the anti-accidental-touch determining module and/or the accidental-touch identification module. The terminal in the embodiments of this application may include the anti-accidental-touch determining module and/or the accidental-touch identification module. Optionally, on the terminal, switches/a switch of the anti-accidental-touch determining module and/or the accidental-touch identification module may be provided, so that a user can choose, on the terminal, whether to enable functions/a function of the anti-accidental-touch determining module and/or the accidental-touch identification module. After the user enables the function of the module, the module performs a corresponding procedure.

To facilitate understanding of the embodiments of this application, the following describes a scenario to which the lock screen interface processing method and the terminal in this application are applicable.

The terminal in the embodiments of this application includes but is not limited to the following electronic devices: a mobile phone, a tablet computer, an e-reader, a handheld game console, a vehicle-mounted electronic device, and the like. An operating system of the terminal may be Android, iOS, Windows Phone, BlackBerry OS, or the like. This is not specifically limited in the embodiments of this application. It should be noted that in the embodiments of this application, a display screen of the terminal has a touch input function, and the terminal has a screen locking function.

Figure 2A:
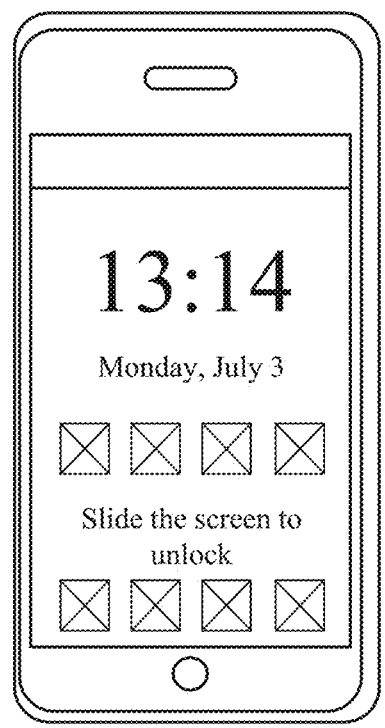
FIG. 2A is a schematic diagram of a sliding unlocking interface according to an embodiment of this application.
Figure 2B:
FIG. 2B is a schematic diagram of a sliding unlocking interface according to an embodiment of this application.
Figure 2C:
FIG. 2C is a schematic diagram of a sliding unlocking interface according to an embodiment of this application.
Figure 2D:
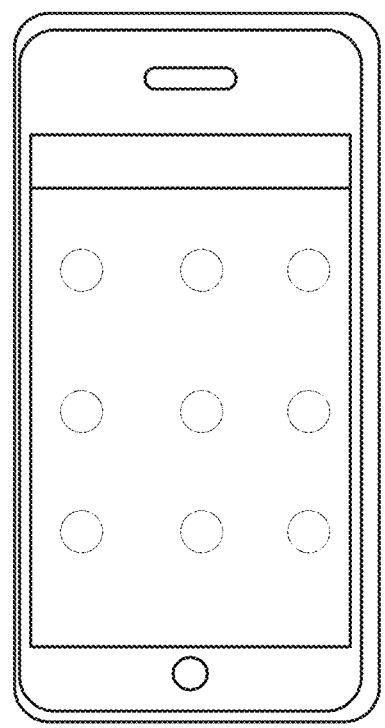
FIG. 2D is a schematic diagram of a pattern unlocking interface according to an embodiment of this application.
Figure 2E:
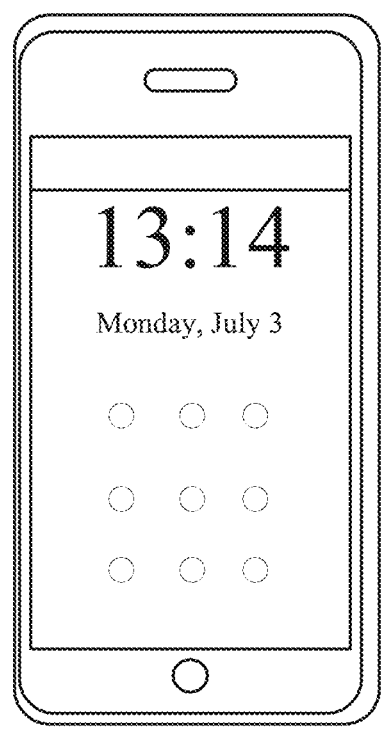
FIG. 2E is a schematic diagram of a pattern unlocking interface according to an embodiment of this application.
Figure 2F:
FIG. 2F is a schematic diagram of a password unlocking interface according to an embodiment of this application.
Figure 2G:
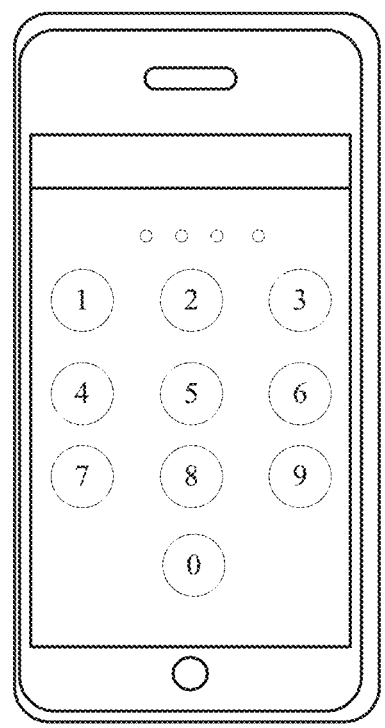
FIG. 2G is a schematic diagram of a password unlocking interface according to an embodiment of this application.
Figure 2H:
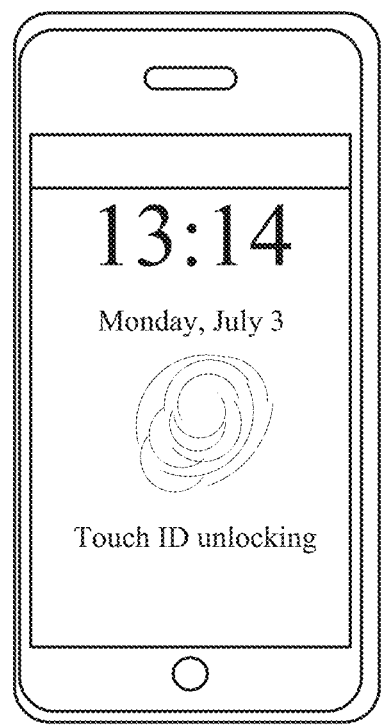
FIG. 2H is a schematic diagram of a fingerprint unlocking interface according to an embodiment of this application.
Figure 2I:
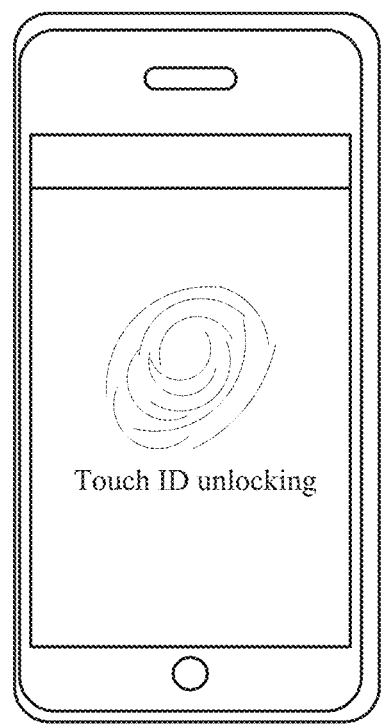
FIG. 2I is a schematic diagram of a fingerprint unlocking interface according to an embodiment of this application.

In the embodiments of this application, after the terminal enters a screen locked state, the terminal may display, after obtaining an instruction for entering a lock screen interface, a lock screen interface corresponding to a preset unlocking manner, for example, a sliding unlocking interface (namely, a lock screen interface corresponding to sliding unlocking) shown in FIG. 2A, FIG. 2B, or FIG. 2C, a pattern unlocking interface (namely, a lock screen interface corresponding to pattern unlocking) shown in FIG. 2D or FIG. 2E, a password unlocking interface (namely, a lock screen interface corresponding to password unlocking) shown in FIG. 2F or FIG. 2G, or a fingerprint unlocking interface (namely, a lock screen interface corresponding to fingerprint unlocking) shown in FIG. 2H or FIG. 2I.

Figure 3A:
FIG. 3A is a schematic diagram of an application scenario of a lock screen interface processing method according to an embodiment of this application.

In a specific scenario, after the terminal enters the screen locked state, a user puts the terminal in a backpack. As shown in FIG. 3A, when the user walks carrying the backpack, the backpack is inevitably shaken, and objects inside the backpack rub against each other; as a result, an object (for example, a key or a pen) inside the backpack touches or presses the terminal, and the object (for example, the key) inside the backpack generates a touch operation in the lock screen interface and/or a fingerprint recognition area of the terminal.

Figure 3B:
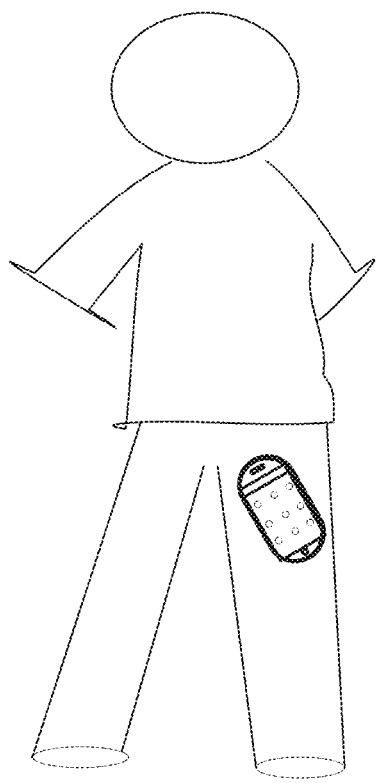
FIG. 3B is a schematic diagram of an application scenario of a lock screen interface processing method according to an embodiment of this application.

In another specific scenario, after the terminal enters the screen locked state, a user puts the terminal in a pocket. As shown in FIG. 3B, when the user walks, a leg inevitably rubs against the mobile phone, and this friction generates a touch operation in the lock screen interface and/or a fingerprint recognition area.

Figure 3C:
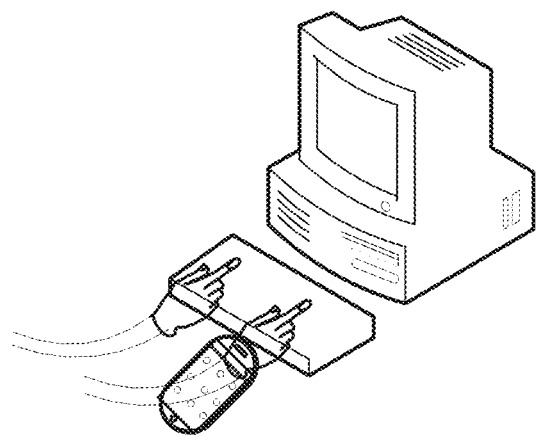
FIG. 3C is a schematic diagram of an application scenario of a lock screen interface processing method according to an embodiment of this application.

In another specific scenario, after the terminal enters the screen locked state, a user places the terminal next to a keyboard. As shown in FIG. 3C, the user accidentally touches the terminal when typing on the keyboard, and consequently a touch operation is generated in the lock screen interface and/or a fingerprint recognition area.

In the foregoing scenarios, when an interface displayed by the terminal is the lock screen interface, the terminal considers an instruction triggered by the generated touch operation, as an unlocking instruction, and therefore triggers a security mode. However, in the embodiments of this application, when the terminal displays the lock screen interface, the terminal may determine, based on the touch operations generated in the foregoing scenarios, that the terminal is currently in an accidental touch scenario, and then perform a related operation to reduce impact of these touch operations on a security mode.

It should be understood that the lock screen interface processing method in this application may also be applied to another scenario in addition to the foregoing scenarios. This is not specifically limited in this application.

It should be understood that the instruction for entering the lock screen interface may include a screen-on instruction or a screen locking instruction. The screen-on instruction is used to turn on a screen, and specifically, may be triggered by an operation such as quickly pressing a power button of the terminal, opening a leather case or a flip cover of the terminal, or turning on the screen by a background application of the terminal. For example, when the screen of the terminal is turned off or turns black, a user or another object presses the power button of the terminal, and the terminal obtains the screen-on instruction, turns on the screen, and presents the lock screen interface. The screen locking instruction is used to switch the terminal from a non-screen-locked state to a screen locked state. For example, a screen locking option is available in a menu of a floating button on the screen of the terminal, and when a user taps the option, the terminal obtains the screen locking instruction and enters the screen locked state; or a user uses a preset operation gesture (for example, double tapping the screen) on the screen of the terminal, and the terminal obtains the screen locking instruction and enters the screen locked state.

It should be understood that a plurality of unlocking manners may be set on one terminal. For example, with password unlocking and fingerprint unlocking combined, the terminal may display the fingerprint unlocking interface shown in FIG. 2H or FIG. 2I; and when it is detected on the fingerprint unlocking interface that a quantity of fingerprint unlocking failures reaches a preset value, the terminal may display the password unlocking interface shown in FIG. 2F or FIG. 2G, to prompt a user to unlock the terminal in the password unlocking manner. There are other scenarios in which the terminal is unlocked by combining a plurality of manners, and the other scenarios are not listed herein.

It should be noted that the sliding unlocking interface is an interface that requires the user to slide in a preset direction to unlock the screen, and the sliding unlocking interface in the embodiments of this application is not limited to the interfaces shown in FIG. 2A to FIG. 2C; the pattern unlocking interface is an interface that requires the user to slide along a preset track to unlock the screen, and the pattern unlocking interface in the embodiments of this application is not limited to the interfaces shown in FIG. 2D and FIG. 2E; the password unlocking interface is an interface that requires the user to enter a preset character to unlock the screen, and the pattern unlocking interface in the embodiments of this application is not limited to the interfaces shown in FIG. 2F and FIG. 2G; and the fingerprint unlocking interface is an interface that requires the user to enter a preset fingerprint in the fingerprint recognition area to unlock the screen, and the pattern unlocking interface in the embodiments of this application is not limited to the interfaces shown in FIG. 2H and FIG. 2I.

Figure 4:
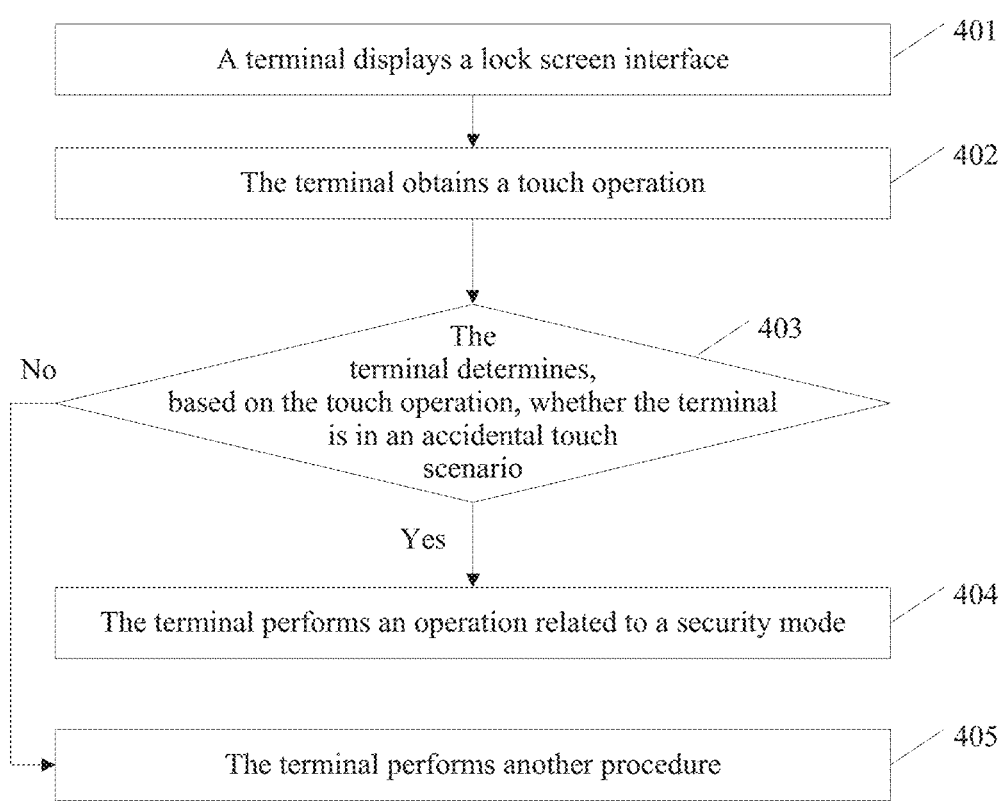
FIG. 4 is a flowchart of an embodiment of a lock screen interface processing method according to embodiments of this application.

Based on the foregoing scenarios, the following describes the lock screen interface processing method in the embodiments of this application. Referring to FIG. 4, an embodiment of the lock screen interface processing method in the embodiments of this application includes the following steps.

401. A terminal displays a lock screen interface.

After the terminal enters a screen locked state, the terminal displays the lock screen interface on a screen after obtaining an instruction for entering the lock screen interface. The lock screen interface may include or certainly may not include prompt information for an unlocking manner.

402. The terminal obtains a touch operation.

In this embodiment of this application, after the terminal displays the lock screen interface on the screen, when a user touches the screen and/or a fingerprint recognition area of the terminal with a finger or another part of the body, or another object, the terminal obtains the touch operation.

403. The terminal determines, based on the touch operation, whether the terminal is in an accidental touch scenario; and if the terminal is in the accidental touch scenario, performs step 404; or if the terminal is not in the accidental touch scenario, performs step 405.

After obtaining the touch operation, the terminal determines touch information corresponding to the touch operation, and then determines, based on the touch information, whether a current scenario of the terminal is the accidental touch scenario. When determining that the current scenario is the accidental touch scenario, the terminal performs step 404.

Specifically, the touch information includes at least one of a touch position, a touch time, touch point coordinates, a touch point track, and touch fingerprint information that are corresponding to the touch operation, and certainly may further include other information.

It should be understood that for different unlocking manners, to improve efficiency and accuracy of accidental-touch identification, there may be different methods for determining whether the obtained touch operation is an accidental touch operation. For details, refer to a framework diagram shown in FIG. 5. For ease of understanding, the following describes each unlocking manner in detail with reference to the accompanying drawing.

1. Pattern unlocking: Pattern unlocking means unlocking the screen by sliding along a preset track in the lock screen interface.

In this embodiment of this application, the lock screen interface displayed by the terminal is a pattern unlocking interface, and correspondingly, the terminal may determine, in one or more of the following manners, whether the obtained touch operation is an accidental touch operation.

(1) The terminal determines whether touch duration of the touch operation is less than a first threshold, and if the touch duration is less than the first threshold, determines that the touch operation is the accidental touch operation.

(2) The terminal determines whether a touch track length corresponding to the touch operation is less than a second threshold, and if the touch track length is less than the second threshold, determines that the touch operation is the accidental touch operation.

It should be understood that a correct unlocking pattern needs to connect to a plurality of specific unlocking sensing keys, and therefore under normal circumstances, a user slides a specific distance and needs a specific amount of time when unlocking the screen in the pattern unlocking manner. For example, track lengths corresponding to patterns such as "L", "N", and "Z" are relatively long. Therefore, a touch operation that has relatively short touch duration (or touch response duration) or a relatively short touch point track length may be considered as an unintentional operation. To be specific, when the terminal determines that touch duration of a touch operation is less than the first threshold or that a touch point track length corresponding to a touch operation is less than the second threshold, the terminal determines that the touch operation is an unintentional operation.

The unlocking sensing key is a sensing key that is in the lock screen interface and that can trigger an unlocking instruction based on a user input, and may be specifically a pattern connecting point in the pattern unlocking interface or a virtual key in the password unlocking interface, for example, round marks in the unlocking interface shown in FIG. 2D or FIG. 2E or number keys in the unlocking interface shown in FIG. 2F or FIG. 2G.

The first threshold is a reference value of touch duration in a case of pattern unlocking. The first threshold may be a value determined by the terminal based on historical unlocking behaviors of the user on the terminal. For example, statistics on touch duration corresponding to touch operations that unlock the terminal successfully in the pattern unlocking manner are collected, and the second threshold is greater than or equal to a greatest value in the touch duration. Alternatively, the second threshold may be a system default value, or may be a value entered by the user in system settings of the terminal. This is not limited.

Figure 6A:
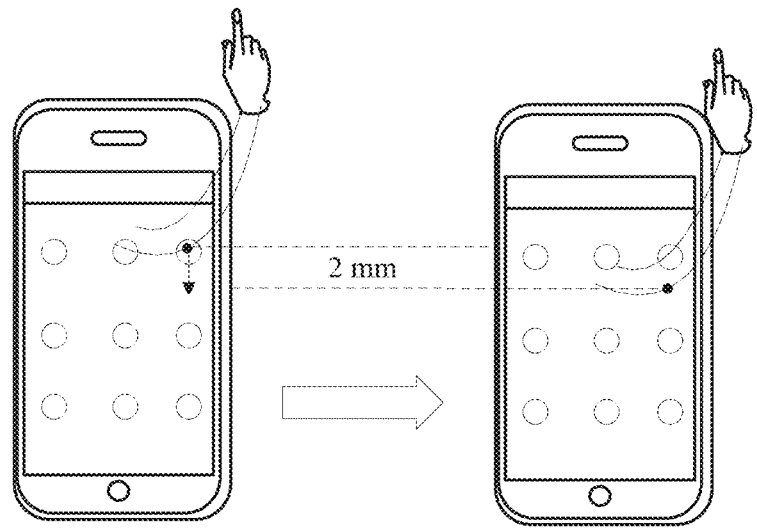
FIG. 6A is a schematic diagram of an accidental touch operation performed in a pattern unlocking interface according to an embodiment of this application.

The second threshold is a reference value of a touch track length in a case of pattern unlocking. The second threshold may be a system default value, or may be a value entered by the user in system settings of the terminal. This is not specifically limited. For example, in the scenario corresponding to FIG. 3C, the terminal displays the pattern unlocking interface; when typing on the keyboard, an elbow of the user is in contact with the terminal and generates a sliding operation shown in FIG. 6A, in which black spots are points of contact between the elbow of the user and the terminal. Assuming that the second threshold is 30 mm, a distance that the elbow of the user slides on the terminal is 2 mm, which is less than the second threshold, and therefore the terminal can determine that the sliding operation is an accidental touch operation.

(3) The terminal determines whether touch point coordinates corresponding to the touch operation include coordinates in an accidental touch area, and if the touch point coordinates corresponding to the touch operation include the coordinates in the accidental touch area, the terminal determines that the touch operation is the accidental touch operation.

It should be understood that in this embodiment of this application, the accidental touch area may be delimited by the user or may be automatically identified by the terminal. The accidental touch area may be specifically an area in the lock screen interface excluding an unlocking sensing key, for example, an area at a distance of a preset value from the unlocking sensing key. Using FIG. 6B as an example, an area out of a dashed-line box may be considered as an accidental touch area.

It should be understood that in this embodiment of this application, the touch point coordinates are touch point coordinates detected by a touchscreen of the terminal because of the touch operation. For example, a finger of the user slides on the screen, and all coordinates corresponding to a track of the sliding are considered as touch point coordinates corresponding to this touch operation. Alternatively, the user presses a first position on the screen with a first finger, and taps a second position on the screen with a second finger while keeping pressing with the first finger. In this case, both coordinates corresponding to the first position and coordinates corresponding to the second position are considered as touch point coordinates corresponding to this touch operation.

Figure 6B:
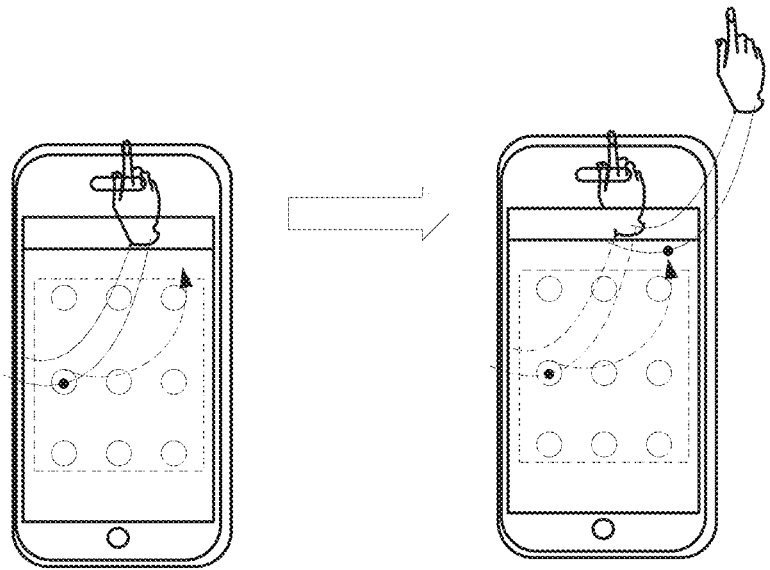
FIG. 6B is a schematic diagram of an accidental touch operation performed in a pattern unlocking interface according to an embodiment of this application.

For example, in the scenario corresponding to FIG. 3C, the terminal displays the pattern unlocking interface; when typing on the keyboard, an elbow of the user is in contact with the terminal and generates a sliding operation shown in FIG. 6B, in which black spots are points of contact between the elbow of the user and the terminal. The elbow of the user slides from a position in the left figure in FIG. 6B to a position in the right figure in FIG. 6B, and the area out of the dashed-line box is the accidental touch area, to be specific, the elbow of the user slides from a non-accidental touch area to the accidental touch area during sliding, and touch point coordinates corresponding to this sliding operation include coordinates in the accidental touch area (for example, coordinates corresponding to the position in the right figure in FIG. 6B). Therefore, the terminal can determine that the sliding operation is an accidental touch operation.

(4) The terminal determines whether the touch operation is a multi-touch-point operation, that is, determines whether a quantity of touch points corresponding to the touch operation is greater than 1, and if the touch operation is the multi-touch-point operation, determines that the touch operation is the accidental touch operation.

Figure 6C:
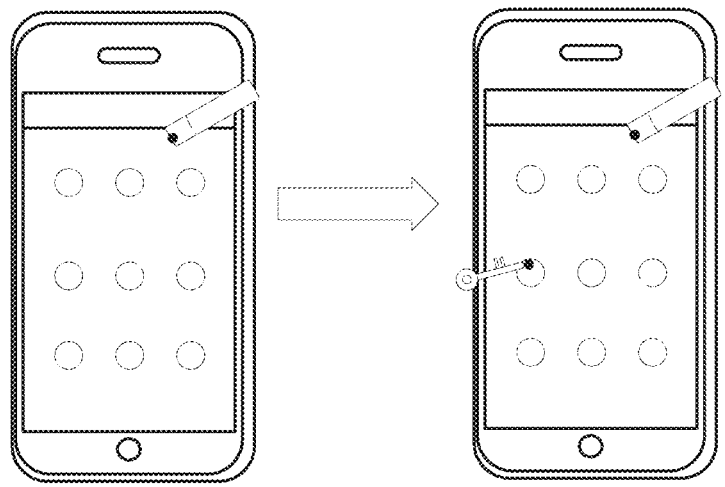
FIG. 6C is a schematic diagram of an accidental touch operation performed in a pattern unlocking interface according to an embodiment of this application.
Figure 7A:
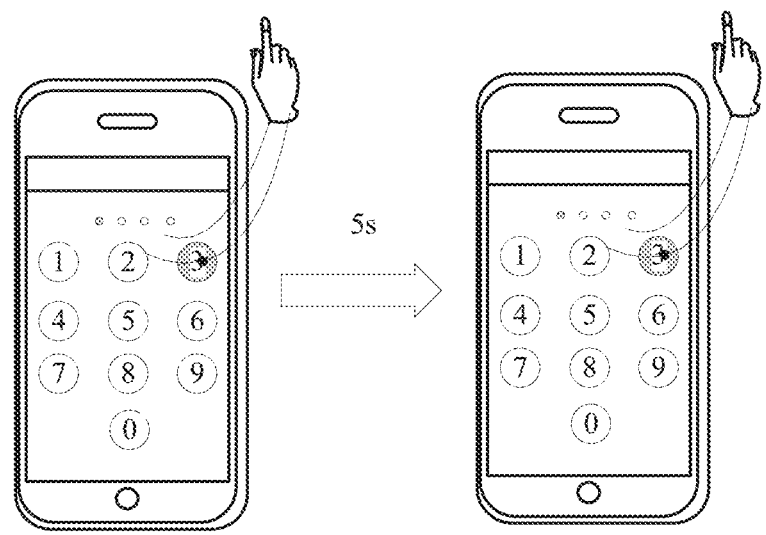
FIG. 7A is a schematic diagram of an accidental touch operation performed in a password unlocking interface according to an embodiment of this application.
Figure 7B:
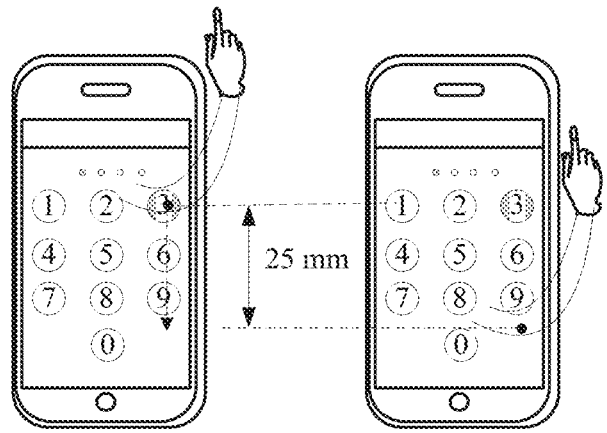
FIG. 7B is a schematic diagram of an accidental touch operation performed in a password unlocking interface according to an embodiment of this application.

It should be understood that the multi-touch-point operation is a touch operation corresponding to a plurality of touch points. For example, in the scenario shown in FIG. 3A, the terminal displays the pattern unlocking interface; the backpack is shaken while the user walks, and consequently the key and the pen inside the backpack are in contact with the terminal, generating a touch operation shown in FIG. 6C. The pen first presses a first position (in the left figure) on the terminal, and when the backpack is shaken, the key then touches a second position (in the right figure) on the terminal. In this case, the terminal detects two touch points (the first position and the second position) on the screen, that is, a quantity of touch points corresponding to the touch operation is greater than 1. The terminal determines that the touch operation is an unintentional operation.

Therefore, when the terminal presents the pattern unlocking interface, the terminal is in an accidental touch environment when the touch operation obtained by the terminal satisfies one or more of the following conditions: The touch duration is less than the first threshold; the touch track length is less than the second threshold; the touch point coordinates include the coordinates in the accidental touch area; and the quantity of touch points is greater than 1. 2. Password unlocking: Password unlocking means unlocking the screen by entering a preset password in the lock screen interface.

In this embodiment of this application, a preset unlocking manner includes password unlocking, and correspondingly, the terminal may determine, in the following manners, whether the obtained touch operation satisfies a preset condition.

(5) The terminal determines whether touch duration of the touch operation is greater than a third threshold, and if the touch duration is greater than the third threshold, determines that the touch operation is the accidental touch operation.

(6) The terminal determines whether a touch point track length corresponding to the touch operation is greater than a fourth threshold, and if the touch point track length is greater than the fourth threshold, determines that the touch operation is the accidental touch operation.

It should be understood that a correct unlocking password includes a plurality of characters, and under normal circumstances, when the user unlocks the terminal in the password unlocking manner, an entered touch operation should be a tap operation. Therefore, when the terminal determines that the touch duration corresponding to the touch operation is greater than the third threshold or that the touch point track length corresponding to the touch operation is greater than the fourth threshold, the terminal can determine that the touch operation is an accidental touch operation.

The third threshold is a reference value of touch duration in a case of password unlocking. The third threshold may be a value determined by the terminal based on historical unlocking behaviors of the user on the terminal. For example, statistics on touch duration corresponding to touch operations that unlock the terminal successfully in the password unlocking manner are collected, and the third threshold is greater than or equal to a greatest value in the touch duration. Alternatively, the second threshold may be a system default value, or may be a value entered by the user in system settings of the terminal. This is not limited in this application.

The fourth threshold is a reference value of a touch track length in a case of password unlocking. The fourth threshold may be a system default value, or may be a value entered by the user in system settings of the terminal. This is not specifically limited in this application.

Therefore, when the terminal presents the password unlocking interface, the terminal is in an accidental touch environment when the touch operation obtained by the terminal satisfies one or more of the following conditions: The touch duration is greater than the third threshold; the touch track length is greater than the fourth threshold; touch point coordinates include coordinates in an accidental touch area; and a quantity of touch points is greater than 1.

(7) The terminal determines whether the touch point coordinates corresponding to the touch operation include the coordinates in the accidental touch area, and if the touch point coordinates corresponding to the touch operation include the coordinates in the accidental touch area, the terminal determines that the touch operation is the accidental touch operation.

This manner is similar to the manner described in (3), and details are not described herein again.

(8) The terminal determines whether the touch operation is a multi-touch-point operation, that is, determines whether a quantity of touch points corresponding to the touch operation is greater than 1, and if the touch operation is the multi-touch-point operation, determines that the touch operation is the accidental touch operation.

This manner is similar to the manner described in (4), and details are not described herein again.

It should be noted that if the lock screen interface displayed by the terminal is the password unlocking interface, the terminal may determine, in any one of the manners in (5) to (8), whether the touch operation is the accidental touch operation, or may determine, by using a combination of a plurality of manners in (5) to (8), whether the touch operation is the accidental touch operation. For example, the manner described in (5) and the manner described in (6) may be combined, to be specific, the terminal considers that the touch operation does not satisfy the preset condition only when determining that the touch duration of the touch operation is greater than the fourth threshold and that the touch point track length of the touch operation is greater than a fifth threshold. For example, the manner described in (7) and the manner described in (8) may be combined, to be specific, the terminal considers that the touch operation is the accidental touch operation only when determining that the touch operation is the multi-touch-point operation and that the touch point coordinates corresponding to the touch operation include the coordinates in the accidental touch area. Other combined manners may also be used, and are not enumerated herein.

3. Fingerprint unlocking: Fingerprint unlocking means unlocking the screen by entering preset fingerprint information in the fingerprint recognition area.

In this embodiment of this application, a preset unlocking manner includes fingerprint unlocking, and correspondingly, the terminal may determine, in the following manners, whether the obtained touch operation satisfies a preset condition.

(9) The terminal determines whether touch duration of the touch operation is greater than a fifth threshold, and if the touch duration is greater than the fifth threshold, determines that the touch operation is the accidental touch operation.

It should be understood that under normal circumstances, when the user unlocks the terminal in the fingerprint unlocking manner, an entered touch operation should be a short-tap operation. Therefore, when the terminal determines that the touch duration corresponding to the touch operation is greater than the fourth threshold, the terminal can determine that the touch operation is the accidental touch operation.

The fifth threshold is a reference value of touch duration in a case of fingerprint unlocking. The fifth threshold may be a value determined by the terminal based on historical unlocking behaviors of the user on the terminal. For example, statistics on touch duration corresponding to touch operations that unlock the terminal successfully in the fingerprint unlocking manner are collected, and the fifth threshold is greater than or equal to a greatest value in the touch duration. Alternatively, the fifth threshold may be a system default value, or may be a value entered by the user in system settings of the terminal. This is not specifically limited in this application.

Figure 8A:
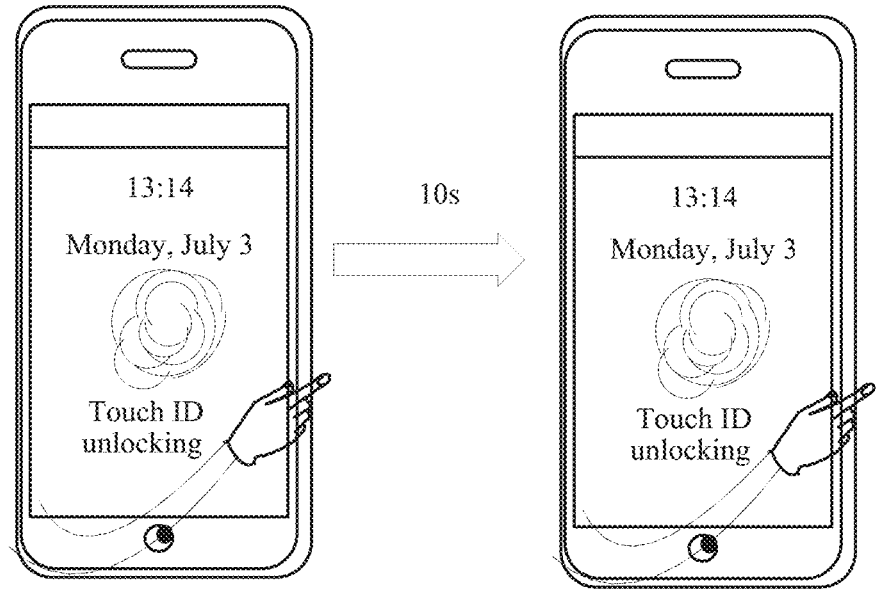
FIG. 8A is a schematic diagram of an accidental touch operation performed in a fingerprint unlocking interface according to an embodiment of this application.

The scenario corresponding to FIG. 3C is used for description below. In the scenario, the terminal displays the fingerprint unlocking interface; when typing on the keyboard, an arm of the user generates a touch operation on the terminal, as shown in FIG. 8A. Assuming that the fifth threshold is 5 s, in the figure, the arm of the user touches a HOME button of the terminal and holds for 10 s, which is greater than the fifth threshold. Therefore, the terminal determines that the touch operation is the accidental touch operation.

(10) The terminal determines whether a touch point corresponding to the touch operation includes a touch point in a non-fingerprint-recognition area, and if the touch point corresponding to the touch operation includes the touch point in the non-fingerprint-recognition area, the terminal determines that the touch operation is the accidental touch operation.

Figure 8B:
FIG. 8B is a schematic diagram of a fingerprint recognition area according to an embodiment of this application.
Figure 8C:
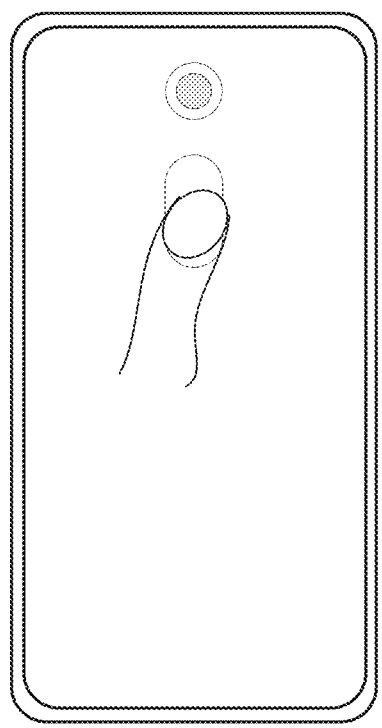
FIG. 8C is a schematic diagram of a fingerprint recognition area according to an embodiment of this application.
Figure 8D:
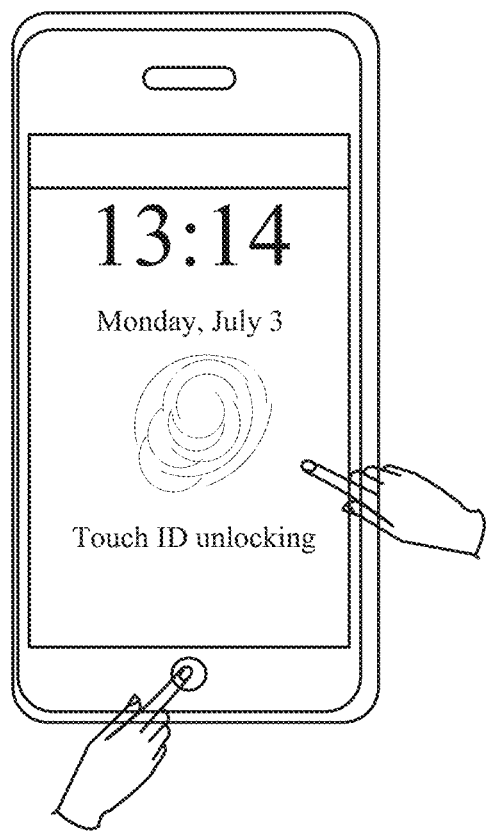
FIG. 8D is a schematic diagram of an accidental touch operation performed in a fingerprint unlocking interface according to an embodiment of this application.

It should be understood that the non-fingerprint-recognition area is a touch sensing area other than the fingerprint recognition area. In actual application, the fingerprint recognition area is usually located in a HOME button area of the terminal, as shown in FIG. 8B, or in a specific recognition area on the back of the terminal, as shown in FIG. 8C, or in another specific area. This is not specifically limited herein. The following uses a specific example for description. As shown in FIG. 8D, it is assumed that the fingerprint recognition area of the terminal is located at a HOME button, and a user (or another object) touches a coordinate point on the screen and the HOME button simultaneously. In this case, the terminal determines that this touch operation corresponds to two touch points, one of which is located on the screen (the non-fingerprint-recognition area). In other words, the touch points corresponding to the touch include the touch point in the non-fingerprint-recognition area. Therefore, the terminal determines that the touch operation is the accidental touch operation. In other words, both the two touch points are accidental touch points.

Therefore, when the terminal presents the fingerprint unlocking interface, the terminal is in an accidental touch environment when the touch operation obtained by the terminal satisfies one or more of the following conditions: The touch duration is greater than the fifth threshold; and whether the touch point corresponding to the touch operation includes the touch point in the non-fingerprint-recognition area. When the terminal determines that the touch operation is the accidental touch operation, the terminal determines that the terminal is in an accidental touch scenario. Specifically, the terminal may determine that the terminal is in the accidental touch scenario, only after determining for a plurality of consecutive times that obtained touch operations are accidental touch operations, and perform step 404; or may determine that a current scenario is the accidental touch scenario, when determining that the current touch operation is the accidental touch operation, and perform step 404.

404. The terminal performs an operation related to a security mode.

When the terminal determines that the terminal is in the accidental touch scenario, the terminal may perform one or more of the following operations related to the security mode, to reduce impact of the accidental touch operation on the security mode.

1. The terminal does not respond to an instruction triggered by the touch operation.

2. The terminal increases a security trigger quantity, where the security trigger quantity is a quantity of consecutive unlocking failures that triggers the security mode, that is, a quantity of unlocking failures allowed by the terminal. When a quantity of consecutive unlocking failures of the terminal within preset duration reaches the security trigger quantity, the terminal enters the security mode.

Specifically, the terminal may determine, based on a quantity of detected unintentional operations, a value by which the security trigger quantity needs to increase. For example, the terminal increases the security trigger quantity by 1 each time the terminal determines one accidental touch operation, or increases the security trigger quantity by 1 each time the terminal determines two unintentional operations.

The following uses an example for description. The security trigger quantity preset by the terminal is 5. The terminal obtains one touch operation after displaying the lock screen interface. The terminal determines that this touch operation fails to unlock the terminal and that this touch operation is an accidental touch operation. In this case, the terminal increases the security trigger quantity to 6.

3. The terminal ignores an unlocking failure caused by the touch operation. To be specific, the unlocking failure caused by the touch operation is not added as a statistical sample, to a quantity of consecutive unlocking failures.

The following uses an example for description. After the terminal displays the lock screen interface, a current quantity of consecutive unlocking failures is 2. In this case, the terminal obtains one touch operation, and the terminal determines that the touch operation fails to unlock the terminal and that the touch operation is an accidental touch operation. The terminal ignores the unlocking failure, to be specific, the unlocking failure is not added as a sample to the quantity of consecutive unlocking failures. The current quantity of consecutive unlocking failures is still 2.

4. The terminal shortens locking duration in the security mode corresponding to the touch operation. It should be understood that a security policy corresponding to the security mode in this embodiment includes locking the terminal for a period of time, and the locking duration in the security mode is a length of this locking period. The security mode corresponding to the touch operation is a security mode triggered by an unlocking failure caused by the touch operation, and N unlocking failure operations that trigger the security mode include at least one accidental touch operation.

Specifically, the terminal may calculate a value by which locking duration needs to be shortened, based on a quantity of accidental touch operations detected within preset duration. For example, one accidental touch operation shortens the locking duration by 5 seconds, and when a quantity of consecutive unlocking failures counted within the preset duration (among which five unlocking failures are caused by unintentional operations) reaches the security trigger quantity, the terminal shortens a locking period of the terminal by 25 seconds. The locking duration may alternatively be a fixed value. For example, when a quantity of consecutive unlocking failures of the terminal counted within the preset duration reaches the security trigger quantity, the terminal fixes a locking period at 10 seconds regardless of whether the quantity of consecutive unlocking failures includes one or more accidental touch operations.

5. An anti-accidental-touch mode is enabled, to prevent an unintentional operation on the terminal. Specifically, a specific interface may be displayed on the screen, and the user cannot perform any operations in the interface, that is, all operations performed in the interface are blocked. The terminal exits the mode only when receiving a specific operation (for example, pressing a power button) of the user or determining that the terminal is in a non-accidental touch environment (for example, determining that proximity light in the screen is not blocked).

6. An alert is given to the user. The alert may include at least one of the following: ringing, vibration, music playing, a voice alert, light flashing, screen-on, and displaying of a prompt interface. The prompt interface is used to prompt the user to enter a preset operation. For details, refer to the following descriptions in an embodiment corresponding to FIG. 9.

405. The terminal performs another procedure.

When the terminal determines that the terminal currently is not in the accidental touch scenario, the terminal may perform another procedure such as determining an unlocking failure and increasing a quantity of unlocking failures.

In this embodiment of this application, when the terminal determines, based on the obtained touch operation, whether the terminal is currently in the accidental touch environment, the terminal may perform the operation related to the security mode, to reduce impact of the touch operation in the accidental touch environment on the security mode. This can prevent the following problems: without consciousness of the user, the terminal is locked, data on the terminal is erased, the terminal is reset to factory settings, and the like. In this way, user experience is improved.

In addition, this embodiment of this application provides a plurality of measures for reducing impact of the accidental touch operation on the security mode, thereby improving flexibility of the solution.

Moreover, this embodiment of this application provides a plurality of manners of determining that the terminal is in the accidental touch scenario, thereby further improving flexibility of the solution.

Figure 9:
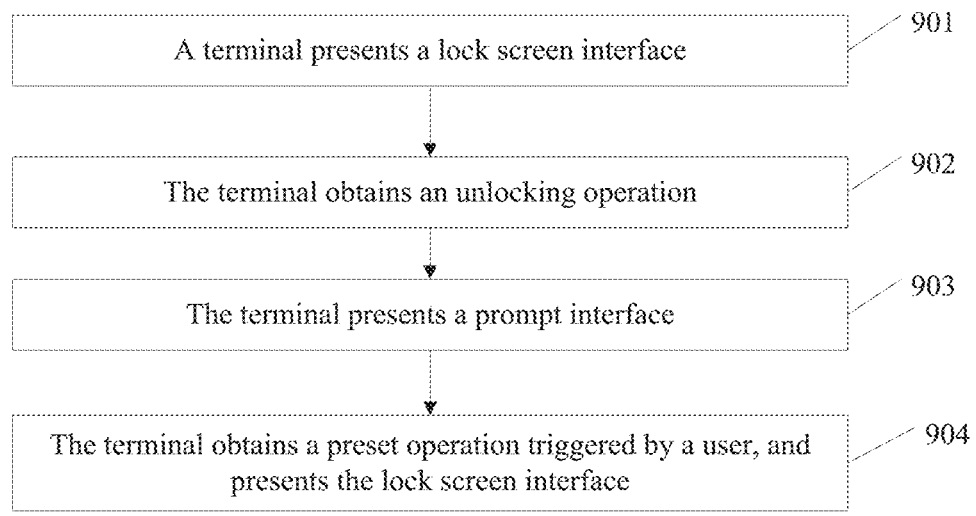
FIG. 9 is a flowchart of another embodiment of a lock screen interface processing method according to embodiments of this application.

An embodiment of this application further provides another lock screen interface processing method. Referring to FIG. 9, another embodiment of the lock screen interface processing method in the embodiments of this application includes the following steps.

901. A terminal presents a lock screen interface.

After the terminal enters a screen locked state, the terminal displays the lock screen interface on a screen after obtaining an instruction for entering the lock screen interface. The lock screen interface may include or certainly may not include prompt information for an unlocking manner.

902. The terminal obtains an unlocking operation.

After the terminal displays the lock screen interface on the screen, a user touches the lock screen interface and/or a fingerprint recognition area of the terminal with a finger or another part of the body, or another object, and the terminal obtains a touch operation, that is, the unlocking operation, performed in the lock screen interface and/or the fingerprint recognition area.

Optionally, in this embodiment, the unlocking operation may include at least one accidental touch operation, and the accidental touch operation is a touch operation in an accidental touch scenario.

Figure 5:
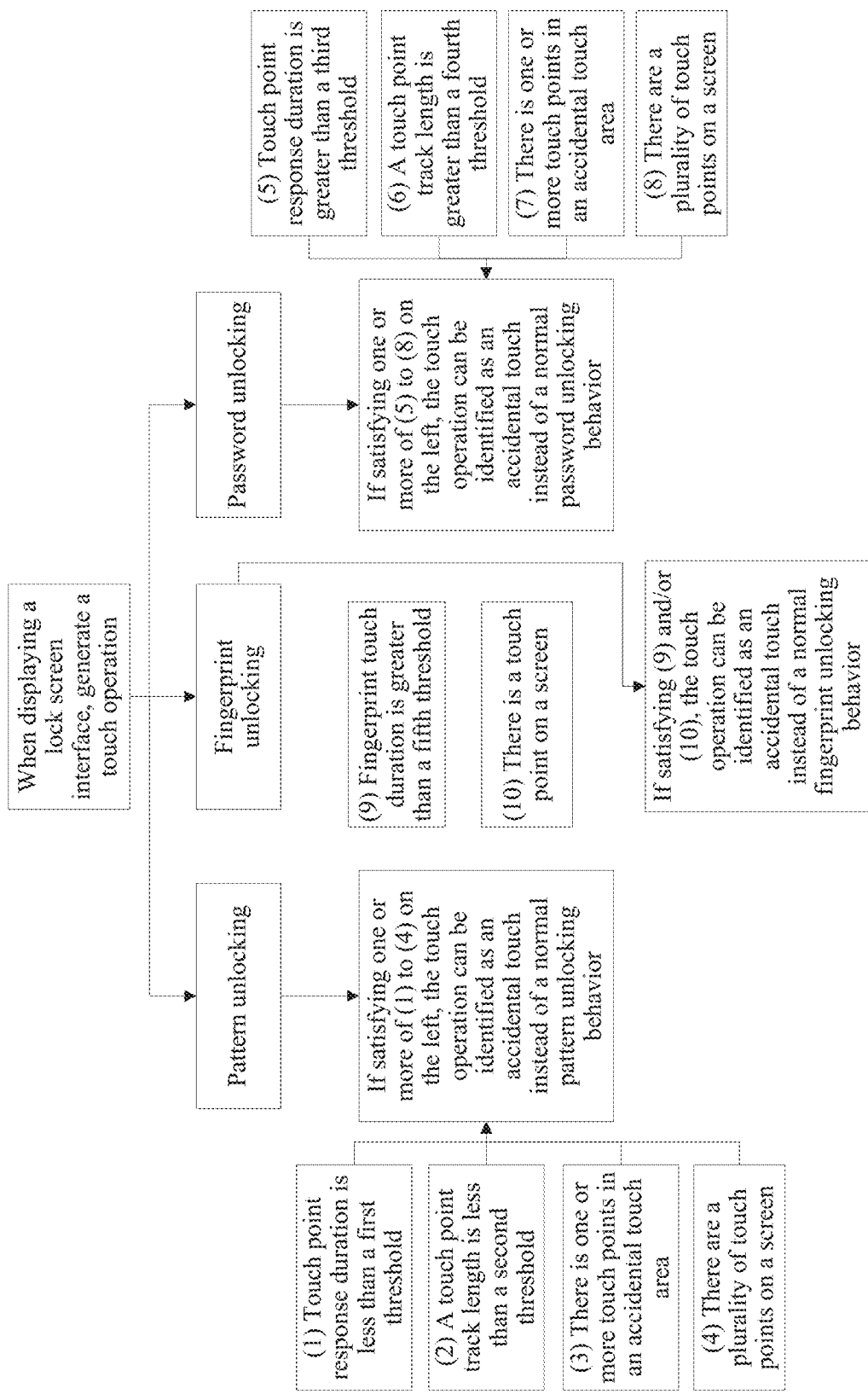
FIG. 5 is a flowchart of identifying an accidental touch operation according to an embodiment of this application.

Specifically, the terminal may determine, in manners (1) to (10) shown in FIG. 5, whether the unlocking operation performed in the lock screen interface and/or the fingerprint recognition area is the accidental touch operation.

In other words, if the lock screen interface presented by the terminal is a pattern unlocking interface, the touch operation in the accidental touch scenario may include at least one of the following: a touch operation that is performed in the pattern unlocking interface and whose touch duration is less than a first threshold; a touch operation that is performed in the pattern unlocking interface and whose touch track length is less than a second threshold; a touch operation that is performed in the pattern unlocking interface and that has more than one touch point; and a touch operation that is performed in the pattern unlocking interface and whose touch point coordinates include coordinates in an accidental touch area.

If the lock screen interface presented by the terminal is a password unlocking interface, the touch operation in the accidental touch scenario includes at least one of the following: a touch operation that is performed in the password unlocking interface and whose touch duration is greater than a third threshold; a touch operation that is performed in the password unlocking interface and whose touch track length is less than a third threshold; a touch operation that is performed in the password unlocking interface and that has more than one touch point; and a touch operation that is performed in the password unlocking interface and whose touch point coordinates include coordinates in an accidental touch area. If the lock screen interface presented by the terminal is a fingerprint unlocking interface, the touch operation in the accidental touch scenario includes at least one of the following: a touch operation that is performed in a fingerprint recognition area and whose touch duration is greater than a fifth threshold; and a touch operation that has a touch point in a non-fingerprint-recognition area.

903. The terminal presents a prompt interface.

If a quantity of unlocking failures reaches M, the terminal presents the prompt interface. The prompt interface is used to prompt the user to enter a preset operation. M is less than N, and N is a security trigger quantity, to be specific, a quantity of unlocking failures that triggers a security mode.

It should be understood that a value of N may be set by a system by default, or may be set by the user; the value may be fixed, or may vary with the security trigger quantity. For example, the value may be fixed at 5, or may be less than the security trigger quantity by 1. A value of M may be set by the system, or may be set by the user. This is not limited herein.

In this embodiment, after presenting the lock screen interface, the terminal obtains at least M unlocking operations, and if none of instructions triggered by M unlocking operations in the at least M unlocking operations matches a preset unlocking instruction, the quantity of unlocking failures reaches M.

Optionally, if the unlocking operation obtained by the terminal includes at least one accidental touch operation, when determining, based on the obtained unlocking operation, that the quantity of unlocking failures reaches M, the terminal presents the prompt interface. In other words, the terminal presents the prompt interface only when the M unlocking failures include at least one unlocking failure that is triggered by the accidental touch operation.

Optionally, if all unlocking operations obtained by the terminal are accidental touch operations, when determining, based on the obtained unlocking operations, that the quantity of unlocking failures reaches M, the terminal presents the prompt interface. In other words, the terminal presents the prompt interface only when all the M unlocking failures are triggered by the accidental touch operations.

Optionally, if the $M^{th}$ unlocking operation obtained by the terminal is an accidental touch operation, when determining, based on the unlocking operation, that the quantity of unlocking failures reaches M, the terminal presents the prompt interface. In other words, the terminal presents the prompt interface only when the $M^{th}$ unlocking failure is triggered by the accidental touch operation.

Optionally, the terminal presents the prompt interface, only when the unlocking operation obtained by the terminal does not include an unintentional unlocking operation and the terminal determines, based on the obtained unlocking operation, that the quantity of unlocking failures reaches M.

Figure 10A:
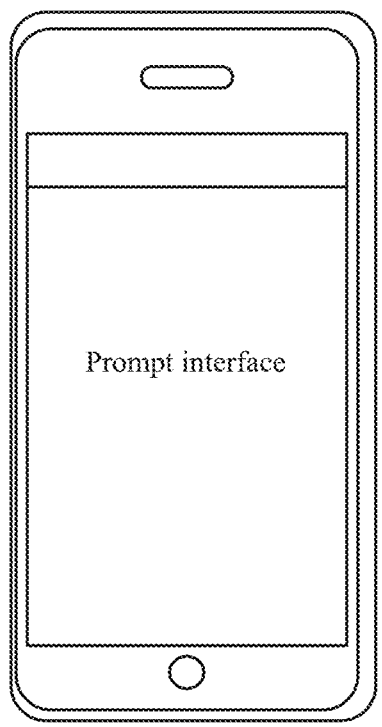
FIG. 10A shows a presentation manner of a prompt interface according to an embodiment of this application.
Figure 10B:
FIG. 10B shows another presentation manner of a prompt interface according to an embodiment of this application.
Figure 10C:
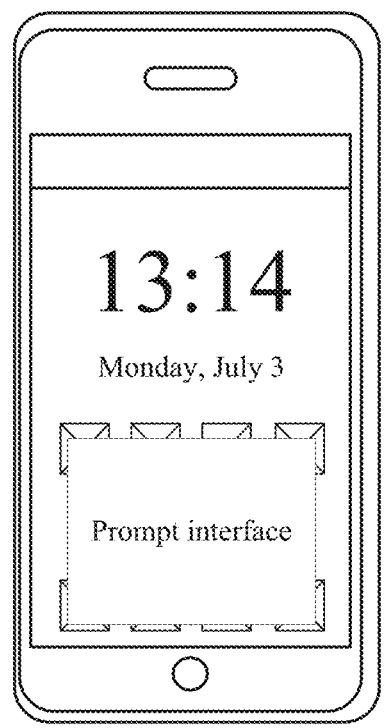
FIG. 10C shows another presentation manner of a prompt interface according to an embodiment of this application.
Figure 10D:
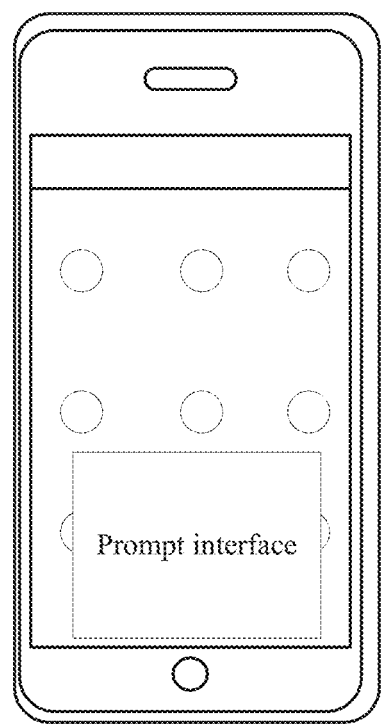
FIG. 10D shows another presentation manner of a prompt interface according to an embodiment of this application.

It should be understood that the terminal may present the prompt interface in a plurality of manners. For example, the prompt interface may be displayed in full screen, as shown in FIG. 10A; the prompt interface may be displayed as a part of the lock screen interface, as shown in FIG. 10B; the prompt interface may be displayed in a form of a message prompt box, as shown in FIG. 10C; and in scenarios of password unlocking and pattern unlocking, the prompt message is superimposed on an unlocking control of the lock screen interface, as shown in FIG. 10D. The terminal may also present the prompt interface in other manners, which are not enumerated herein.

904. The terminal obtains the preset operation triggered by the user, and presents the lock screen interface.

The prompt interface presented by the terminal is used to prompt the user to enter the preset operation. The preset operation is an operation that requires particular input logic for implementation, that is, an operation that can be implemented only by a conscious behavior generated by the user through analysis.

Optionally, in this embodiment, after presenting the prompt interface, the terminal may block all inputs in an area outside the prompt interface. Such inputs are specifically, for example, an input in the fingerprint recognition area, an input in an interface other than the prompt interface on the screen, and an input from a function key such as a HOME button, a power button, or a volume button.

Optionally, in this embodiment, when the terminal obtains an operation different from the preset operation, the terminal does not respond to the operation, and the prompt interface is still presented on the screen. The terminal responds only when the terminal obtains the preset operation that is entered by the user based on the prompt interface, and presents the lock screen interface on the screen, so that the user can continue to unlock the terminal in the lock screen interface. In other words, the terminal always presents the prompt interface or continues presenting the prompt interface before the terminal obtains the preset operation triggered by the user.

It should be understood that in this case, the quantity of unlocking failures counted by the terminal is still M, and the terminal does not clear the quantity of unlocking failures.

The following describes in detail specific presentation content of the prompt interface.

In this embodiment, the prompt interface may be used to prompt the user to enter a sliding operation. The sliding operation is corresponding to at least one of the following types of sliding information: a preset start point, a preset end point, a preset track, preset duration, and a preset length.

Figure 11A:
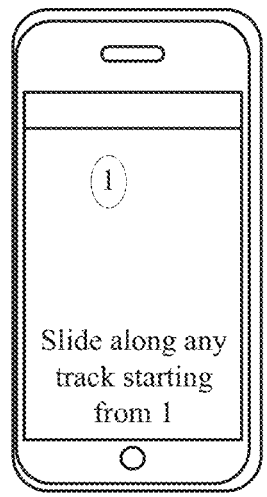
FIG. 11A is a schematic diagram of an embodiment of a prompt interface according to embodiments of this application.
Figure 11B:
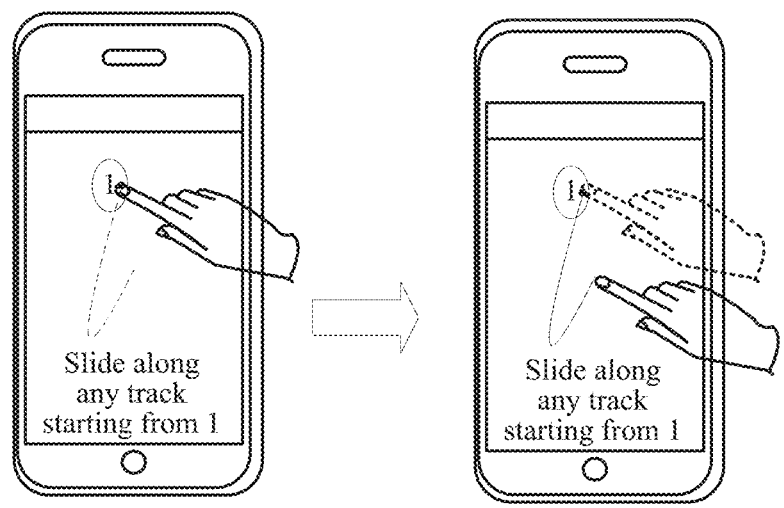
FIG. 11B is a schematic diagram of entering a preset operation by a user according to an embodiment of this application.

As shown in FIG. 11A, the prompt interface is used to prompt the user to start sliding from the preset start point. According to a prompt, the user first touches a touch point 1 (the preset start point), and then slides along any track, as shown in FIG. 11B. The terminal obtains this operation and displays the lock screen interface.

Figure 12A:
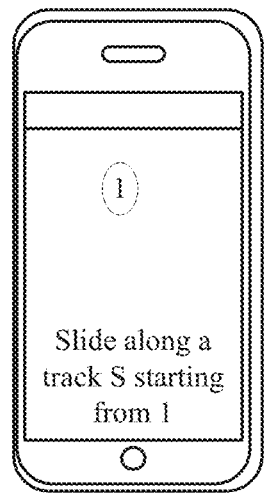
FIG. 12A is a schematic diagram of an embodiment of a prompt interface according to embodiments of this application.
Figure 12B:
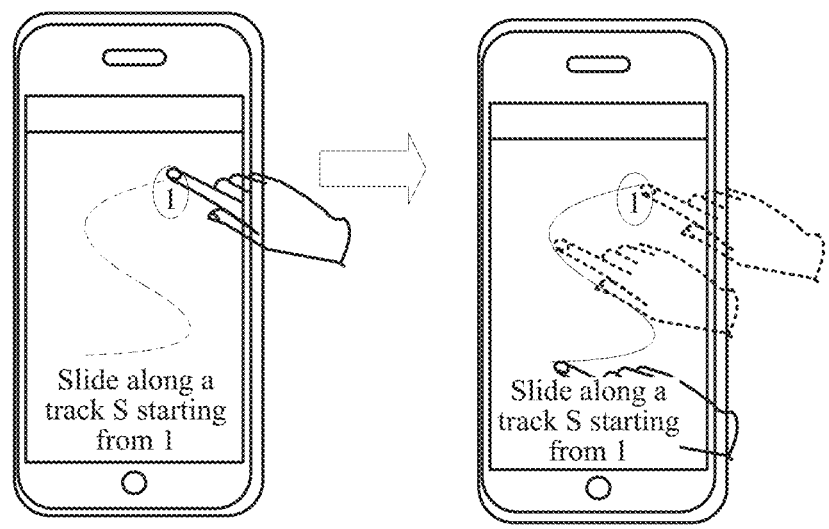
FIG. 12B is a schematic diagram of entering a preset operation by a user according to an embodiment of this application.

As shown in FIG. 12A, the prompt interface is used to prompt the user to start sliding along a preset track from the preset start point. According to a prompt, the user first touches a touch point 1 (the preset start point), and then slides along a track S (the preset track), as shown in FIG. 12B. The terminal obtains this operation and displays the lock screen interface.

Figure 13A:
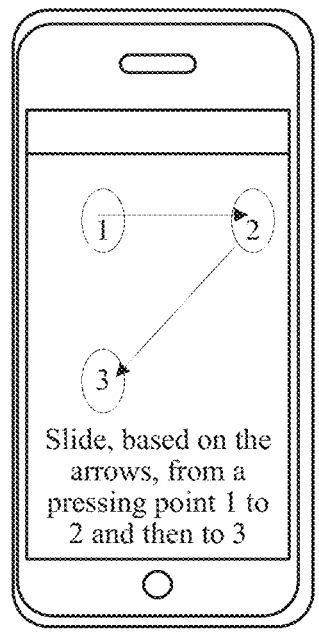
FIG. 13A is a schematic diagram of an embodiment of a prompt interface according to embodiments of this application.
Figure 13B:
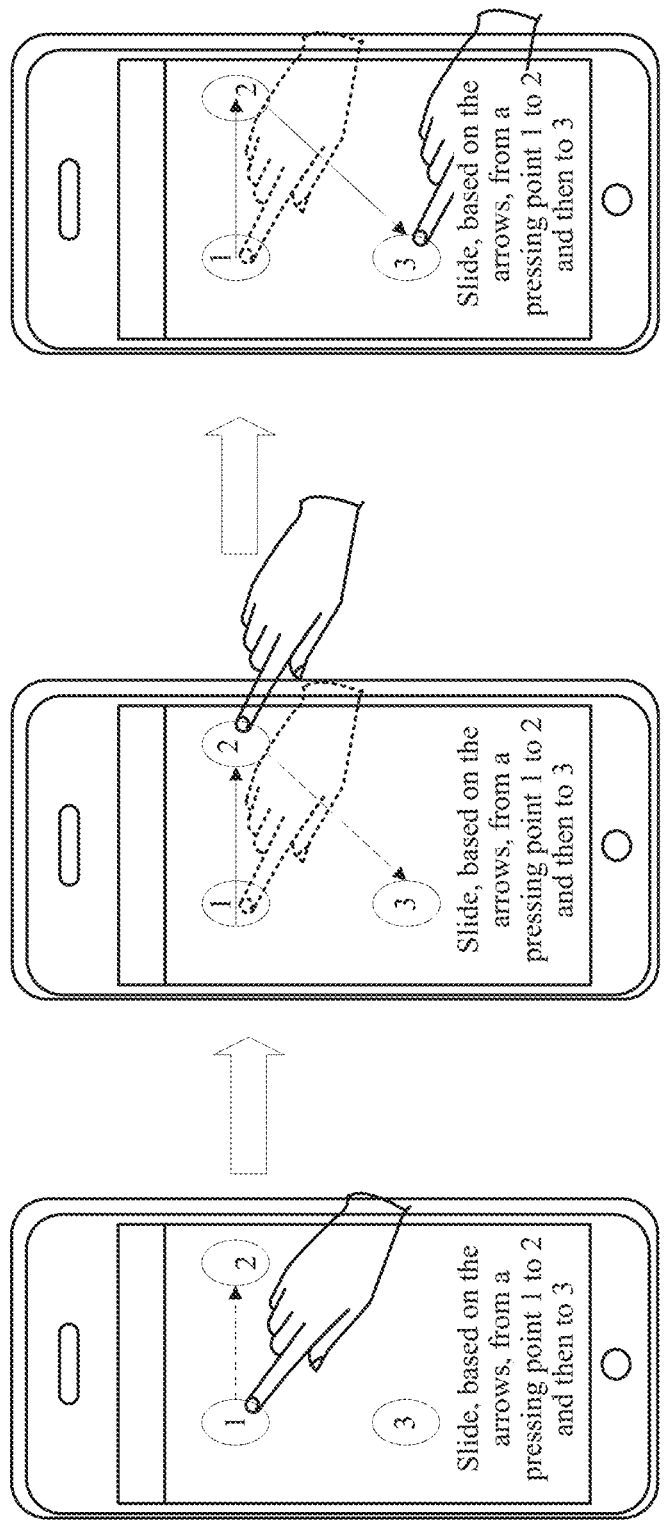
FIG. 13B is a schematic diagram of entering a preset operation by a user according to an embodiment of this application.

As shown in FIG. 13A, the prompt interface is used to prompt the user to touch a fixed position and then slide along a fixed track. According to a prompt, the user first touches a pressing point 1 (the preset start point), and then slides to a pressing point 2 and then to a pressing point 3 (sliding along the preset track to the preset end point), as shown in FIG. 13B. The terminal obtains this operation and displays the lock screen interface.

Figure 14A:
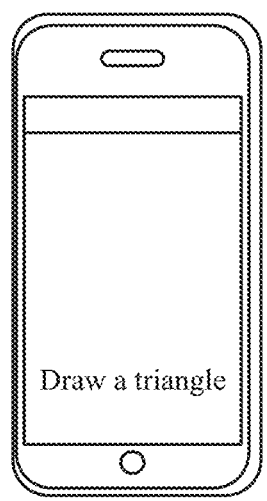
FIG. 14A is a schematic diagram of an embodiment of a prompt interface according to embodiments of this application.
Figure 14B:
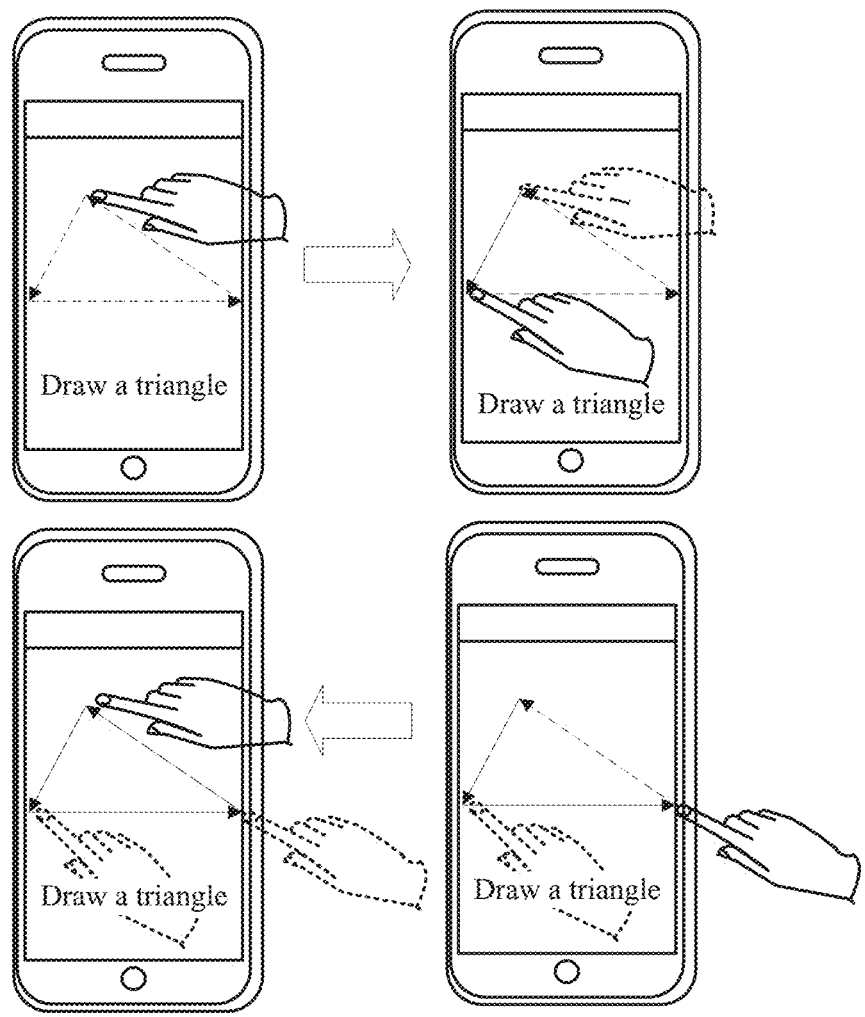
FIG. 14B is a schematic diagram of entering a preset operation by a user according to an embodiment of this application.

As shown in FIG. 14A, the prompt interface is used to prompt the user to slide to draw a preset figure (along the preset track). According to a prompt, the user slides on the screen along a track shown in FIG. 14B. The terminal obtains this operation and displays the lock screen interface.

Figure 15A:
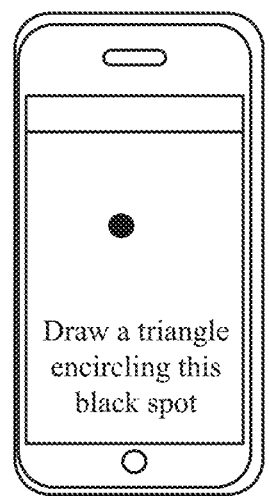
FIG. 15A is a schematic diagram of an embodiment of a prompt interface according to embodiments of this application.
Figure 15B:
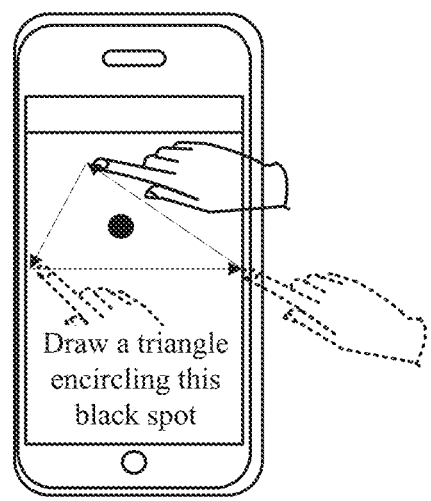
FIG. 15B is a schematic diagram of entering a preset operation by a user according to an embodiment of this application.

As shown in FIG. 15A, the prompt interface is used to prompt the user to slide to draw a specific figure (along the preset track) including a preset element. According to a prompt, the user draws a triangle encircling the black spot on the screen, as shown in FIG. 15B. The terminal obtains this operation and displays the lock screen interface.

In this embodiment, the prompt interface is used to prompt the user to drag a specific element to a specified position, and the specific element may be specifically a figure, a number, a word, a letter, or the like. This is not specifically limited herein.

Figure 16A:
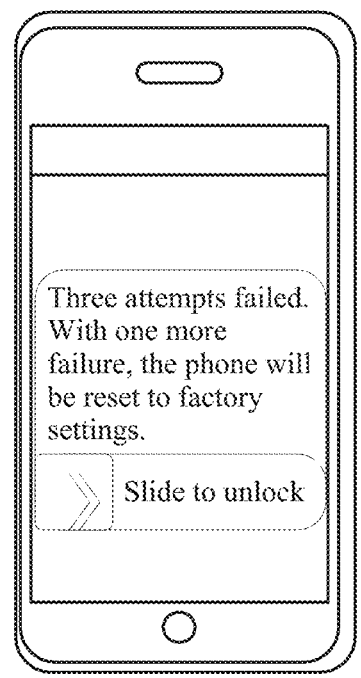
FIG. 16A is a schematic diagram of an embodiment of a prompt interface according to embodiments of this application.
Figure 16B:
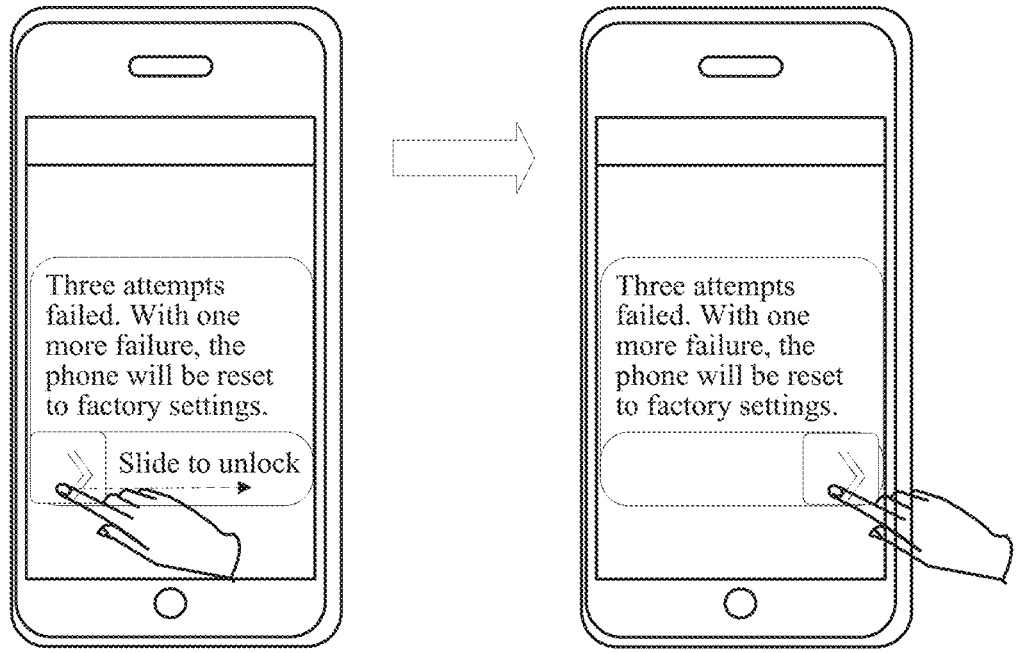
FIG. 16B is a schematic diagram of entering a preset operation by a user according to an embodiment of this application.

As shown in FIG. 16A, the prompt interface is used to prompt the user to drag a slider to a specific position. According to a prompt, the user drags the slider to the other end of a sliding box, as shown in FIG. 16B. The terminal obtains this operation and displays the lock screen interface.

Figure 17A:
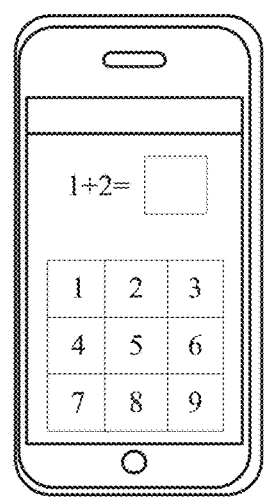
FIG. 17A is a schematic diagram of an embodiment of a prompt interface according to embodiments of this application.
Figure 17B:
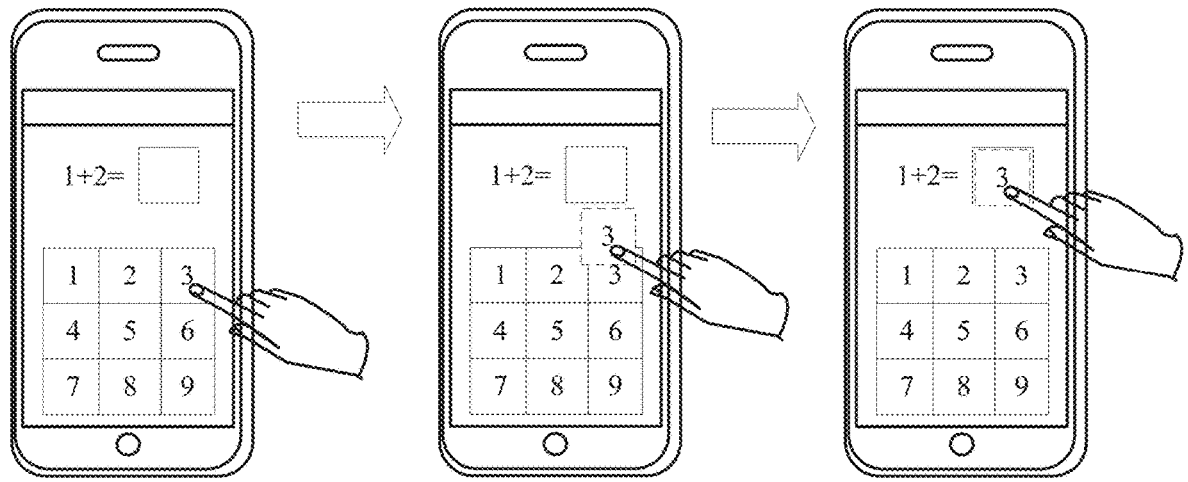
FIG. 17B is a schematic diagram of entering a preset operation by a user according to an embodiment of this application.

As shown in FIG. 17A, the prompt interface is used to prompt the user to drag a specific number to a specific position. According to a prompt, the user works out 1+2=3, and then drags 3 from a table below to an input box in the figure, as shown in FIG. 17B. The terminal obtains this operation and displays the lock screen interface.

In this embodiment, the prompt interface may be used to prompt the user to enter a tap operation. The tap operation is corresponding to at least one of the following types of tap information: a preset tap position and preset tap duration.

Figure 18A:
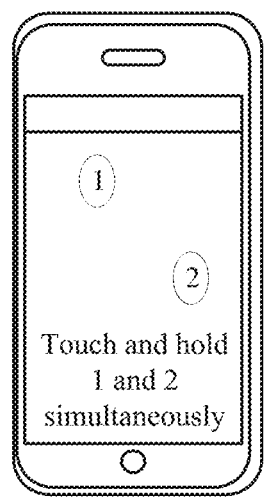
FIG. 18A is a schematic diagram of an embodiment of a prompt interface according to embodiments of this application.
Figure 18B:
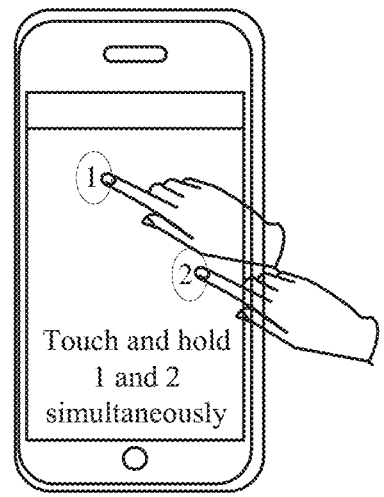
FIG. 18B is a schematic diagram of entering a preset operation by a user according to an embodiment of this application.

It should be understood that the preset tap position may be fixed. As shown in FIG. 18A, the prompt interface is used to prompt the user to simultaneously tap a plurality of positions (the preset tap position). The user simultaneously taps a pressing point 1 and a pressing point 2 according to a prompt, as shown in FIG. 18B. The terminal obtains this operation and displays the lock screen interface.

Figure 19A:
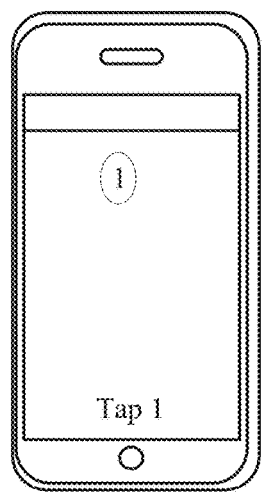
FIG. 19A is a schematic diagram of an embodiment of a prompt interface according to embodiments of this application.
Figure 19B:
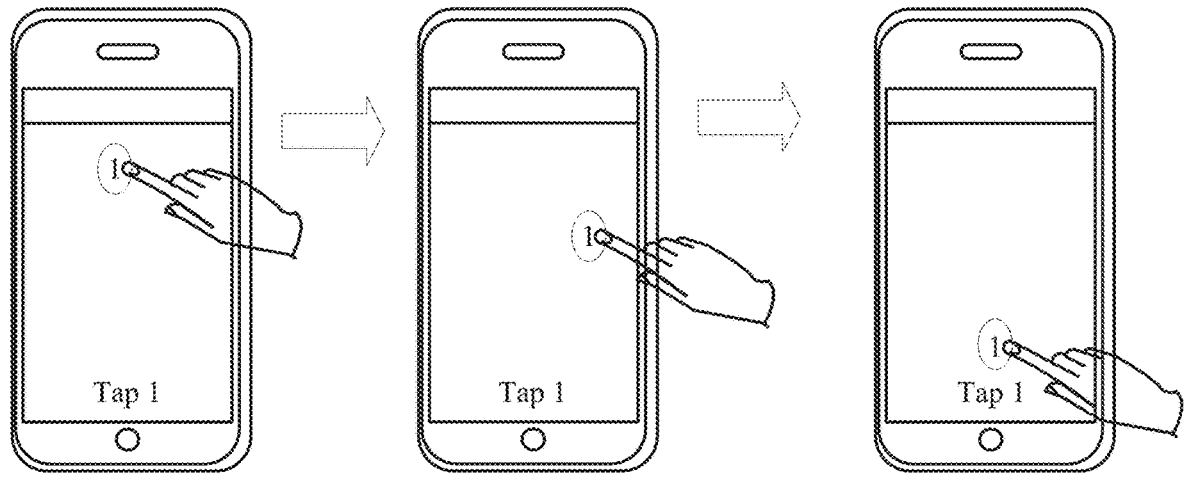
FIG. 19B is a schematic diagram of entering a preset operation by a user according to an embodiment of this application.

The preset tap position may alternatively be movable. As shown in FIG. 19A, the prompt interface is used to prompt the user to tap a specific position (the preset tap position). When the user taps a pressing point 1, the pressing point 1 moves to another position; the user taps the position of the pressing point 1 again, and the pressing point 1 moves again; and the user taps the position of the pressing point 1 again (in a preset tap order), as shown in FIG. 19B. The terminal obtains this operation and displays the lock screen interface.

Figure 19C:
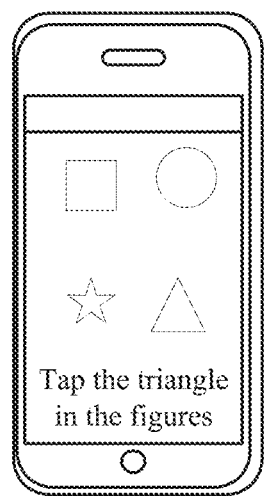
FIG. 19C is a schematic diagram of an embodiment of a prompt interface according to embodiments of this application.
Figure 19D:
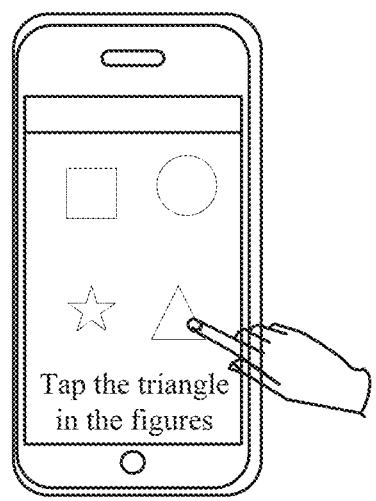
FIG. 19D is a schematic diagram of entering a preset operation by a user according to an embodiment of this application.

The preset position may be a position corresponding to a specified figure that needs to be selected by the user from a plurality of elements. As shown in FIG. 19C, the prompt interface is used to prompt the user to select a specified element from a plurality of elements. The user taps a triangle according to a prompt, as shown in FIG. 19D. The terminal obtains this operation and displays the lock screen interface.

Figure 20A:
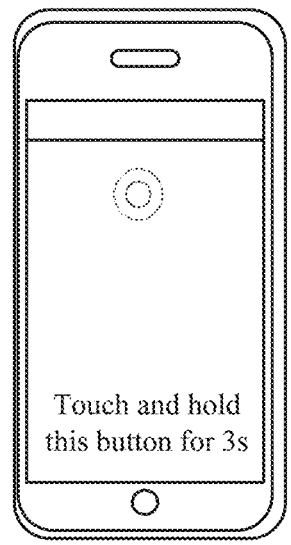
FIG. 20A is a schematic diagram of an embodiment of a prompt interface according to embodiments of this application.
Figure 20B:
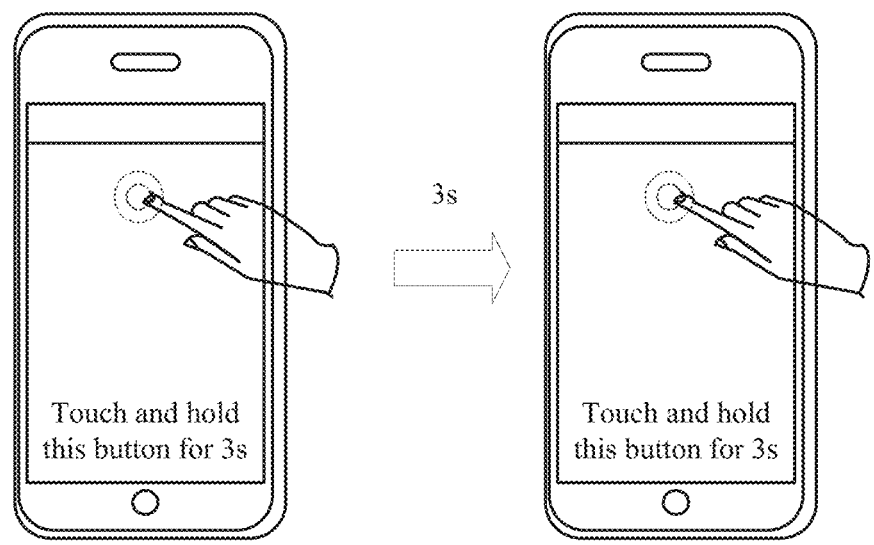
FIG. 20B is a schematic diagram of entering a preset operation by a user according to an embodiment of this application.

It should be understood that the preset tap duration is a time length for which the user taps a position and holds. As shown in FIG. 20A, the prompt interface is used to prompt the user to tap the preset tap position and hold for more than the preset tap duration. The user touches a button and holds for 3 seconds according to a prompt, as shown in FIG. 20B. The terminal obtains this tap operation and displays the lock screen interface.

Figure 21A:
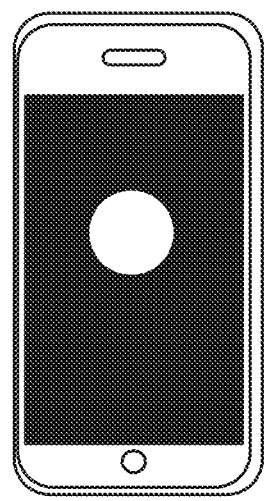
FIG. 21A is a schematic diagram of an embodiment of a prompt interface according to embodiments of this application.
Figure 21B:
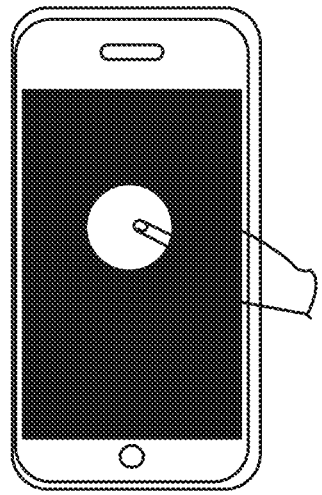
FIG. 21B is a schematic diagram of entering a preset operation by a user according to an embodiment of this application.

It should be understood that in this embodiment, the terminal may light only some of areas in a display interface, and extinguish pixels corresponding to another area, to prompt the user to tap the lighted area. As shown in FIG. 21A, pixels corresponding to a black part in the figure are extinguished. The user taps an area in which pixels are lighted in the figure, as shown in FIG. 21B. The terminal obtains this tap operation and displays the lock screen interface.

Figure 22A:
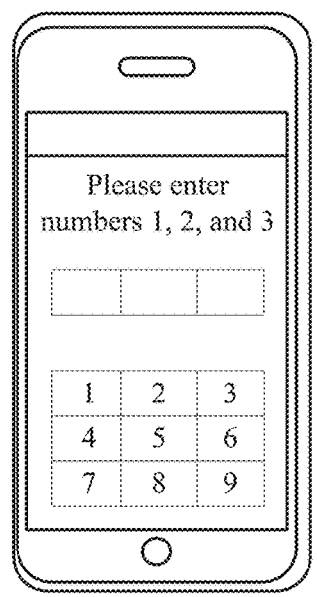
FIG. 22A is a schematic diagram of an embodiment of a prompt interface according to embodiments of this application.
Figure 22B:
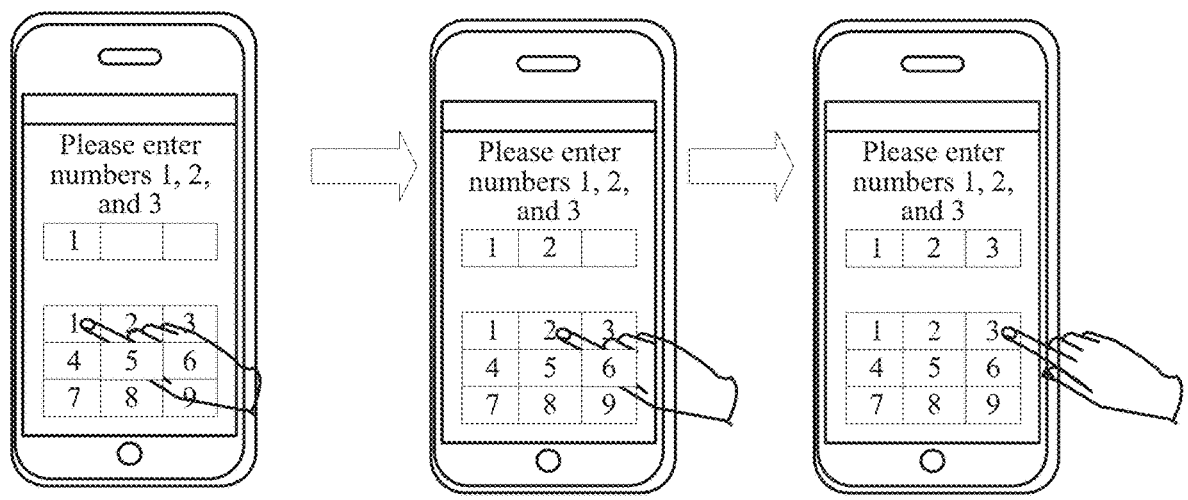
FIG. 22B is a schematic diagram of entering a preset operation by a user according to an embodiment of this application.

In this embodiment, the prompt interface may be used to prompt the user to enter a preset character, as shown in FIG. 22A. The user enters numbers 1, 2, and 3 according to a prompt, as shown in FIG. 22B. The terminal obtains the preset characters entered by the user, and displays the lock screen interface.

Figure 23A:
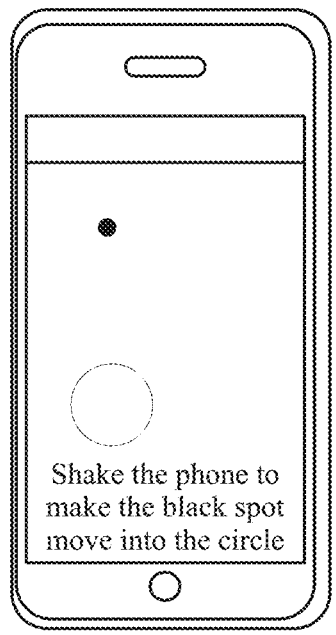
FIG. 23A is a schematic diagram of an embodiment of a prompt interface according to embodiments of this application.
Figure 23B:
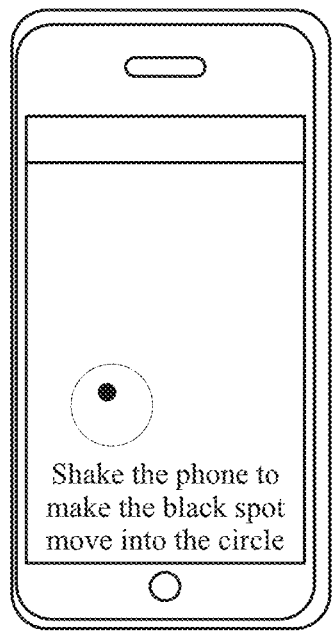
FIG. 23B is a schematic diagram of entering a preset operation by a user according to an embodiment of this application.

In this embodiment, the prompt interface may be used to prompt the user to shake the mobile phone to make a specific element move to a specified position, as shown in FIG. 23A. The user tilts the mobile phone to the lower left to move a black spot in the prompt interface, to make the black spot move into a circle, as shown in FIG. 23B. When the terminal detects that the black spot moves into the circle, the terminal displays the lock screen interface.

Optionally, in this embodiment of this application, the terminal may further give an alert when presenting the prompt interface. The alert given by the terminal may include at least one of the following: ringing, vibration, screen flashing, screen-on, and a voice alert. After the alert is given, the terminal stops the alert only when the terminal obtains the preset operation that is entered by the user based on the prompt interface. In other words, after the terminal gives the alert, the terminal does not stop the alert if a touch operation obtained by the terminal is not the preset operation. For example, a terminal program keeps ringing when presenting the prompt interface, and does not stop ringing until the preset operation entered by the user is received.

It should be noted that, the prompt interface may prompt the user to enter the preset operation, by using a visual indication and/or a voice prompt. This is not specifically limited herein.

In this embodiment of this application, when the quantity of unlocking failures reaches M, the terminal may display the prompt interface to prompt the user to enter the preset operation. The preset operation is an operation that requires particular input logic for implementation and is a confirming operation triggered by a conscious behavior of the user. Therefore, an accidental touch behavior generated by an object or in another situation cannot enter the preset operation. This can prevent an accidental touch operation from triggering the security mode, and avoid the following problems: without consciousness of the user, the terminal is locked, data on the terminal is erased, the terminal is reset to factory settings, and the like. In this way, user experience is improved.

This embodiment of this application provides a plurality of manners of prompting the user to enter the preset operation, thereby improving flexibility of the solution.

Figure 24:
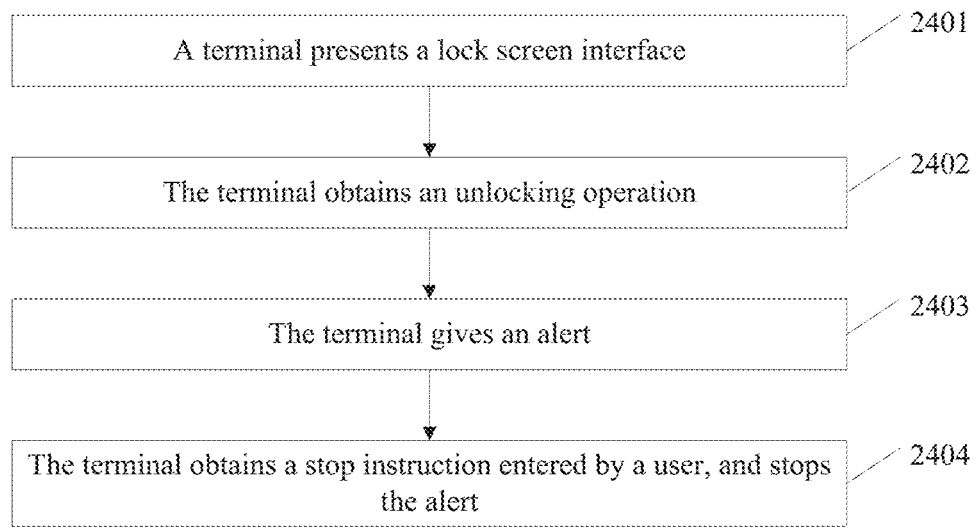
FIG. 24 is a schematic diagram of another embodiment of a lock screen interface processing method according to embodiments of this application.

An embodiment of this application further provides another lock screen interface processing method. Referring to FIG. 24, another embodiment of the lock screen interface processing method in the embodiments of this application includes the following steps.

2401. A terminal presents a lock screen interface.

After the terminal enters a screen locked state, the terminal displays the lock screen interface on a screen after obtaining an instruction for entering the lock screen interface. The lock screen interface may include or certainly may not include prompt information for an unlocking manner.

2402. The terminal obtains an unlocking operation.

After the terminal displays the lock screen interface on the screen, a user touches the lock screen interface and/or a fingerprint recognition area of the terminal with a finger or another part of the body, or another object, and the terminal obtains a touch operation, that is, the unlocking operation, performed in the lock screen interface and/or the fingerprint recognition area.

Optionally, in this embodiment, the unlocking operation may include at least one accidental touch operation, and the accidental touch operation is a touch operation in an accidental touch scenario.

Specifically, the terminal may determine, in manners (1) to (10) shown in FIG. 5, whether the unlocking operation performed in the lock screen interface and/or the fingerprint recognition area is an unintentional operation.

In other words, if the lock screen interface presented by the terminal is a pattern unlocking interface, the touch operation in the accidental touch scenario may include at least one of the following: a touch operation that is performed in the pattern unlocking interface and whose touch duration is less than a first threshold; a touch operation that is performed in the pattern unlocking interface and whose touch track length is less than a second threshold; a touch operation that is performed in the pattern unlocking interface and that has more than one touch point; and a touch operation that is performed in the pattern unlocking interface and whose touch point coordinates include coordinates in an accidental touch area.

If the lock screen interface presented by the terminal is a password unlocking interface, the touch operation in the accidental touch scenario includes at least one of the following: a touch operation that is performed in the password unlocking interface and whose touch duration is greater than a third threshold; a touch operation that is performed in the password unlocking interface and whose touch track length is less than a third threshold; a touch operation that is performed in the password unlocking interface and that has more than one touch point; and an operation that is performed in the password unlocking interface and whose touch point coordinates include coordinates in an accidental touch area.

If the lock screen interface presented by the terminal is a fingerprint unlocking interface, the touch operation in the accidental touch scenario includes at least one of the following: a touch operation that is performed in a fingerprint recognition area and whose touch duration is greater than a fifth threshold; and a touch operation that has a touch point in a non-fingerprint-recognition area.

2403. The terminal gives an alert.

If a quantity of unlocking failures reaches M, the terminal gives the alert, where M is less than N, and N is a security trigger quantity, to be specific, a quantity of unlocking failures that triggers a security mode.

It should be understood that a value of N may be set by a system by default, or may be set by the user; the value may be fixed, or may vary with the security trigger quantity. For example, the value may be fixed at 5, or may be less than the security trigger quantity by 1. A value of M may be set by the system, or may be set by the user. This is not limited herein.

Optionally, if the unlocking operation obtained by the terminal includes at least one accidental touch operation, when determining, based on the obtained unlocking operation, that the quantity of unlocking failures reaches M, the terminal gives the alert. In other words, the terminal gives the alert only when the M unlocking failures include at least one unlocking failure that is triggered by the accidental touch operation.

Optionally, if all unlocking operations obtained by the terminal are accidental touch operations, when determining, based on the obtained unlocking operations, that the quantity of unlocking failures reaches M, the terminal presents a prompt interface. In other words, the terminal gives the alert only when all the M unlocking failures are triggered by the accidental touch operations.

Optionally, if the $M^{th}$ unlocking operation obtained by the terminal is an accidental touch operation, when determining, based on the unlocking operation, that the quantity of unlocking failures reaches M, the terminal presents a prompt interface. In other words, the terminal gives the alert only when the $M^{th}$ unlocking failure is triggered by the accidental touch operation.

Optionally, the terminal gives the alert, only when the unlocking operation obtained by the terminal does not include an unintentional unlocking operation and the terminal determines, based on the obtained unlocking operation, that the quantity of unlocking failures reaches M.

The terminal may determine, in manners (1) to (10) shown in FIG. 5, whether the unlocking operation performed in the lock screen interface and/or the fingerprint recognition area is the accidental touch operation.

Optionally, in this embodiment, when the terminal gives the alert, the screen of the terminal may turn black (turn off), or present the lock screen interface, or present a confirming button, or present the prompt interface, where the prompt interface is used to prompt the user to enter a preset operation. When presenting the prompt interface, the terminal may block all inputs in an area outside the prompt interface. Such inputs are specifically, for example, an input in the fingerprint recognition area, an input in an interface other than the prompt interface on the screen, and an input from a function key such as a HOME button, a power button, or a volume button. In other words, when the terminal obtains an operation different from the preset operation, the terminal does not respond to the operation, and the prompt interface is still presented on the screen.

Optionally, in this embodiment, the alert given by the terminal may include at least one of the following: ringing, vibration, screen flashing, screen-on, and a voice alert.

2404. The terminal obtains a stop instruction entered by the user, and stops the alert.

After the terminal gives the alert, the alert continues, and does not stop until the terminal obtains the stop instruction entered by the user.

Optionally, in this embodiment, the terminal may present the lock screen interface when stopping the alert.

Optionally, in this embodiment, if the terminal presents the prompt interface when giving the alert, the stop instruction refers to the preset operation indicated in the prompt interface. For specific presentation content of the prompt interface, refer to the foregoing related descriptions in step 904 in the embodiment corresponding to FIG. 9. Details are not described herein again.

Figure 25:
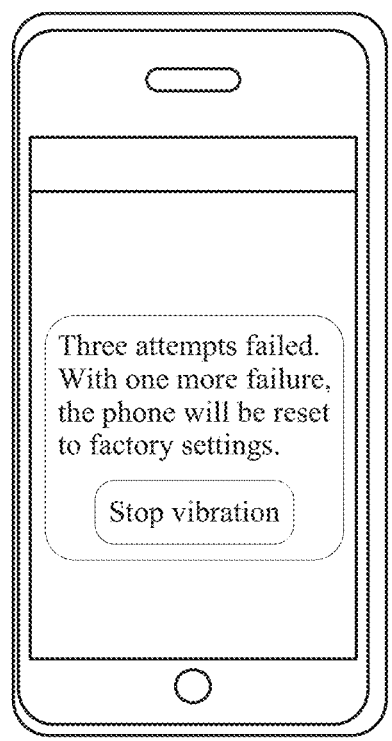
FIG. 25 is a schematic diagram of a stop instruction trigger button according to an embodiment of this application.

Optionally, in this embodiment, if the terminal presents the confirming button when giving the alert, the stop instruction refers to tapping the confirming button, as shown in FIG. 25.

Optionally, in this embodiment, the stop instruction may alternatively be a specific operation gesture, for example, double tapping the screen. The stop instruction may alternatively be pressing a specific button, for example, pressing the power button or the HOME button.

In this embodiment of this application, when the quantity of unlocking failures reaches M, the terminal may give the alert continuously, so that the user can have a clear perception even if the terminal is in a pocket, a backpack, or another position. This can prevent the security mode from being triggered by a plurality of accidental touches when the terminal is in an accidental touch environment. In this way, user experience is improved.

Figure 26:
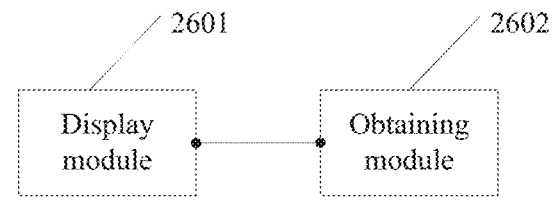
FIG. 26 is a schematic diagram of an embodiment of a terminal according to embodiments of this application.

The foregoing describes the lock screen interface processing method in the embodiments of this application. The following describes the terminal in the embodiments of this application. Referring to FIG. 26, an embodiment of the terminal in the embodiments of this application includes:

a display module 2601, configured to present a lock screen interface; and an obtaining module 2602, configured to obtain an unlocking operation, where the unlocking operation includes at least one of an operation performed in the lock screen interface and an operation performed in a fingerprint recognition area.

The display module 2601 is further configured to: when a quantity of unlocking failures reaches M, present a prompt interface, where the prompt interface is used to prompt a user to enter a preset operation, M is less than N, and N is a quantity of unlocking failures that triggers a security mode.

The obtaining module 2602 is further configured to obtain the preset operation triggered by the user.

The display module 2601 is further configured to: when the obtaining module obtains the preset operation, present the lock screen interface.

In this embodiment of this application, when the quantity of unlocking failures reaches M, the display module 2601 may display the prompt interface to prompt the user to enter the preset operation. The preset operation is an operation that requires particular input logic for implementation and is a confirming operation triggered by a conscious behavior of the user. Therefore, an accidental touch behavior generated by an object or in another situation cannot enter the preset operation. This can prevent an accidental touch operation from triggering the security mode, and avoid the following problems: without consciousness of the user, the terminal is locked, data on the terminal is erased, the terminal is reset to factory settings, and the like. In this way, user experience is improved.

Figure 27:
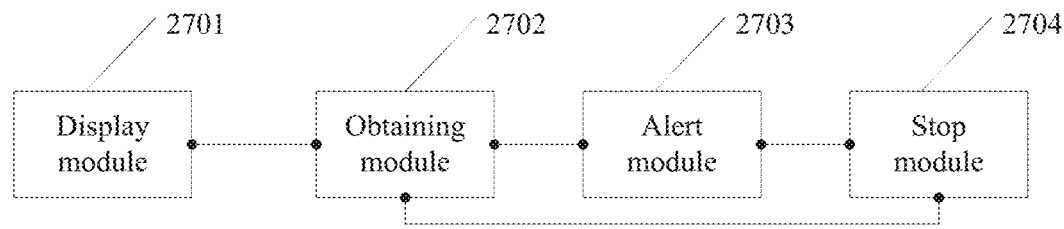
FIG. 27 is a schematic diagram of another embodiment of a terminal according to embodiments of this application.

For ease of understanding, referring to FIG. 27, another embodiment of the terminal in the embodiments of this application includes:

a display module 2701, configured to present a lock screen interface; and an obtaining module 2702, configured to obtain an unlocking operation, where the unlocking operation includes at least one of an operation performed in the lock screen interface and an operation performed in a fingerprint recognition area.

The display module 2701 is further configured to: when a quantity of unlocking failures reaches M, present a prompt interface, where the prompt interface is used to prompt a user to enter a preset operation, M is less than N, and N is a quantity of unlocking failures that triggers a security mode.

The obtaining module 2702 is further configured to obtain the preset operation triggered by the user.

The display module 2701 is further configured to: when the obtaining module obtains the preset operation, present the lock screen interface.

The obtaining module 2702 is further configured to obtain an operation different from the preset operation.

The display module 2701 is further configured to present the prompt interface.

Optionally, in this embodiment, the terminal may further include:

an alert module 2703, configured to: when the quantity of unlocking failures reaches M, give an alert, where the alert may include at least one of the following: ringing, vibration, light flashing, screen-on, a voice alert, and music; and a stop module 2704, configured to stop the alert.

Optionally, in this embodiment, the unlocking operation may include at least one accidental touch operation, and the accidental touch operation is a touch operation in an accidental touch scenario.

When the presented lock screen interface is a pattern unlocking interface, the touch operation in the accidental touch scenario includes at least one of the following:

a touch operation that is performed in the pattern unlocking interface and whose touch duration is less than a first threshold;

a touch operation that is performed in the pattern unlocking interface and whose touch track length is less than a second threshold;

a touch operation that is performed in the pattern unlocking interface and that has more than one touch point; and a touch operation that is performed in the pattern unlocking interface and whose touch point coordinates include coordinates in an accidental touch area.

When the presented lock screen interface is a password unlocking interface, the touch operation in the accidental touch scenario includes at least one of the following:

a touch operation that is performed in the password unlocking interface and whose touch duration is greater than a third threshold;

a touch operation that is performed in the password unlocking interface and whose touch track length is less than a third threshold;

a touch operation that is performed in the password unlocking interface and that has more than one touch point; and a touch operation that is performed in the password unlocking interface and whose touch point coordinates include coordinates in an accidental touch area.

When the presented lock screen interface is a fingerprint unlocking interface, the touch operation in the accidental touch scenario includes at least one of the following:

a touch operation that is performed in a fingerprint recognition area and whose touch duration is greater than a fifth threshold; and a touch operation that has a touch point in a non-fingerprint-recognition area.

Optionally, in this embodiment, the preset operation may include any one of the following:

a tap operation corresponding to preset tap information, where the preset tap information includes at least one of the following: a preset tap position, preset tap duration, and a preset tap order;

a sliding operation corresponding to preset sliding information, where the preset sliding information includes at least one of the following: a preset sliding start point, a preset sliding end point, a preset sliding track, preset sliding duration, and a preset sliding length; or sliding a specific element to a preset position.

Optionally, in this embodiment, the prompt interface may be specifically used to provide at least one of the following prompts for the user:

prompting the user to slide along any track from a pressing point in the prompt interface;

prompting the user to slide along a specific track from a pressing point in the prompt interface;

prompting the user to slide, in an order indicated by arrows, from a first pressing point to a second pressing point and then to a third pressing point;

prompting the user to draw a specific figure;

prompting the user to draw a specific figure including a specific element displayed in the prompt interface;

prompting the user to drag a slider to a specific position;

prompting the user to drag a character that matches a formula displayed in the prompt interface, to a specific position;

prompting the user to simultaneously touch a plurality of touch points in the prompt interface;

prompting the user to tap a specific dynamically moving element in the prompt interface;

prompting the user to select a specific element from a plurality of elements in the prompt interface;

prompting the user to press a specific position in the prompt interface for preset duration;

prompting the user to tap a lighted area in the prompt interface;

prompting the user to enter a specific character; or prompting the user to shake the terminal to make a specific element in the prompt interface move to a specific position in the prompt interface.

It should be understood that a procedure performed by the modules in the terminal corresponding to FIG. 27 is similar to the method procedure described in the embodiment shown in FIG. 9, and details are not described herein again.

In this embodiment of this application, when the quantity of unlocking failures reaches M, the display module 2701 may display the prompt interface to prompt the user to enter the preset operation. The preset operation is an operation that requires particular input logic for implementation and is a confirming operation triggered by a conscious behavior of the user. Therefore, an accidental touch behavior generated by an object or in another situation cannot enter the preset operation. This can prevent an accidental touch operation from triggering the security mode, and avoid the following problems: without consciousness of the user, the terminal is locked, data on the terminal is erased, the terminal is reset to factory settings, and the like. In this way, user experience is improved.

In addition, this embodiment of this application provides a plurality of manners of displaying the prompt interface, thereby improving flexibility of the solution.

Moreover, in this embodiment of this application, the alert may be given, so that the user can perceive, in a timely manner, that terminal unlocking fails for a plurality of times. In this way, user experience is improved.

Figure 28:
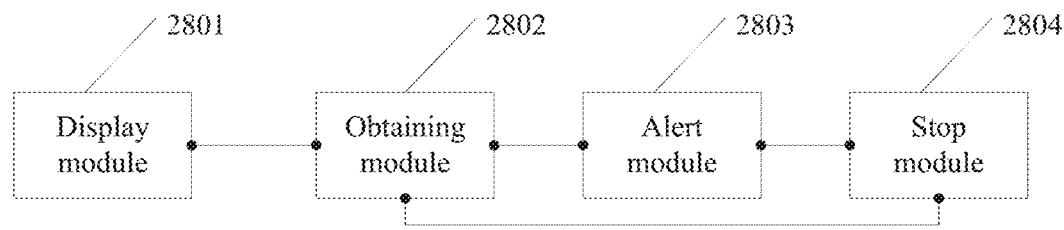
FIG. 28 is a schematic diagram of another embodiment of a terminal according to embodiments of this application.

Referring to FIG. 28, another embodiment of the terminal in the embodiments of this application includes:

a display module 2801, configured to present a lock screen interface;

an obtaining module 2802, configured to obtain an unlocking operation, where the unlocking operation includes at least one of an operation performed in the lock screen interface and an operation performed in a fingerprint recognition area;

an alert module 2803, configured to: when a quantity of unlocking failures reaches M, give an alert, where the obtaining module 2804 is further configured to obtain a stop instruction entered by a user; and a stop module 2805, configured to: when the obtaining module obtains the stop instruction, stop the alert.

In this embodiment of this application, when the quantity of unlocking failures reaches M, the alert module 2803 may give the alert continuously, so that the user can have a clear perception even if the terminal is in a pocket, a backpack, or another position. This can prevent a security mode from being triggered by a plurality of accidental touches when the terminal is in an accidental touch environment. In this way, user experience is improved.

Based on the embodiment corresponding to FIG. 28, in another embodiment of the terminal provided in this application, the display module is further configured to: when the quantity of unlocking failures reaches M, display a prompt interface, where the prompt interface is used to prompt the user to enter a preset operation; and the stop instruction is an instruction triggered by the preset operation.

This embodiment of this application provides an alert manner, thereby improving implementability of the solution.

Based on the embodiment corresponding to FIG. 28, in another embodiment of the terminal provided in this application, the alert may include at least one of the following: ringing, vibration, light flashing, screen-on, a voice alert, and music.

This embodiment of this application provides a plurality of alert modes, thereby improving flexibility of the solution.

It should be understood that a procedure performed by the modules in the terminal corresponding to FIG. 28 is similar to the method procedure described in the embodiment shown in FIG. 24, and details are not described herein again.

Figure 29:
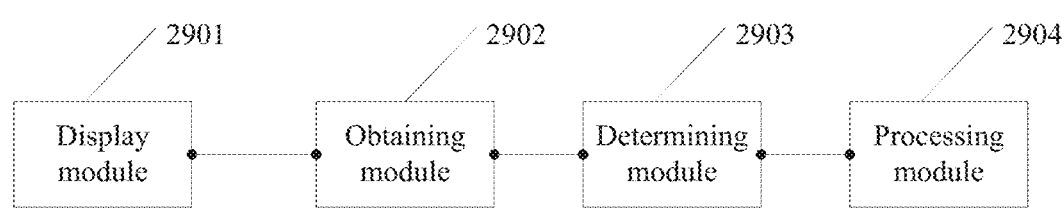
FIG. 29 is a schematic diagram of another embodiment of a terminal according to embodiments of this application.

Referring to FIG. 29, another embodiment of the terminal in the embodiments of this application includes:

a display module 2901, configured for the terminal to display a lock screen interface;

an obtaining module 2902, configured to obtain a touch operation, where the touch operation includes at least one of an operation performed in the lock screen interface and an operation performed in a fingerprint recognition area;

a determining module 2903, configured to determine, based on the touch operation, that the terminal is in an accidental touch scenario; and a processing module 2904, configured to: when the determining module 2903 determines, based on the touch operation, that the terminal is in the accidental touch scenario, perform an operation related to a security mode.

In this embodiment of this application, when the terminal determines, based on the obtained touch operation, whether the terminal is currently in an accidental touch environment, the terminal may perform the operation related to the security mode, to reduce impact of the touch operation in the accidental touch environment on the security mode. This can avoid the following problems: without consciousness of a user, the terminal is locked, data on the terminal is erased, the terminal is reset to factory settings, and the like. In this way, user experience is improved.

Based on the embodiment corresponding to FIG. 29, in another embodiment of the terminal provided in this application, the processing module 2904 is specifically configured to:

skip responding to the touch operation; or ignore an unlocking failure caused by the touch operation; or increase a security trigger quantity, where the security trigger quantity is a quantity of unlocking failures that triggers the security mode; or decrease locking duration in the security mode corresponding to the touch operation; or enable an anti-accidental-touch mode; or display a prompt interface, where the prompt interface is used to prompt the user to enter a preset operation; or give an alert, where the alert includes at least one of the following: ringing, vibration, light flashing, screen-on, a voice alert, and music.

This embodiment of this application provides a plurality of operations related to the security mode, thereby improving flexibility of the solution.

Based on the embodiment corresponding to FIG. 29, in another embodiment of the terminal provided in this application, the lock screen interface is a pattern unlocking interface; and the determining module is specifically configured to:

determine that touch duration corresponding to the touch operation is less than a first threshold; or determine that a touch track length corresponding to the touch operation is less than a second threshold; or determine that a quantity of touch points corresponding to the touch operation is greater than 1; or determine that touch point coordinates corresponding to the touch operation include coordinates in an accidental touch area.

This embodiment of this application provides a plurality of manners of determining the accidental touch environment, thereby improving flexibility of the solution.

Based on the embodiment corresponding to FIG. 29, in another embodiment of the terminal provided in this application, the lock screen interface is a password unlocking interface; and the determining module is specifically configured to:

determine that touch duration corresponding to the touch operation is greater than a third threshold; or determine that a touch track length corresponding to the touch operation is greater than a fourth threshold; or determine that a quantity of touch points corresponding to the touch operation is greater than 1; or determine that touch point coordinates corresponding to the touch operation include coordinates in an accidental touch area.

This embodiment of this application provides a plurality of manners of determining the accidental touch environment, thereby improving flexibility of the solution.

Based on the embodiment corresponding to FIG. 29, in another embodiment of the terminal provided in this application, the lock screen interface is a fingerprint unlocking interface; and the determining module is specifically configured to:

determine that touch duration of the touch operation is greater than a fifth threshold; or determine that a touch point corresponding to the touch operation includes a touch point in a non-fingerprint-recognition area.

This embodiment of this application provides a plurality of manners of determining the accidental touch environment, thereby improving flexibility of the solution.

It should be understood that a procedure performed by the modules in the terminal corresponding to FIG. 29 is similar to the method procedure described in the embodiment shown in FIG. 4, and details are not described herein again.

Figure 30:
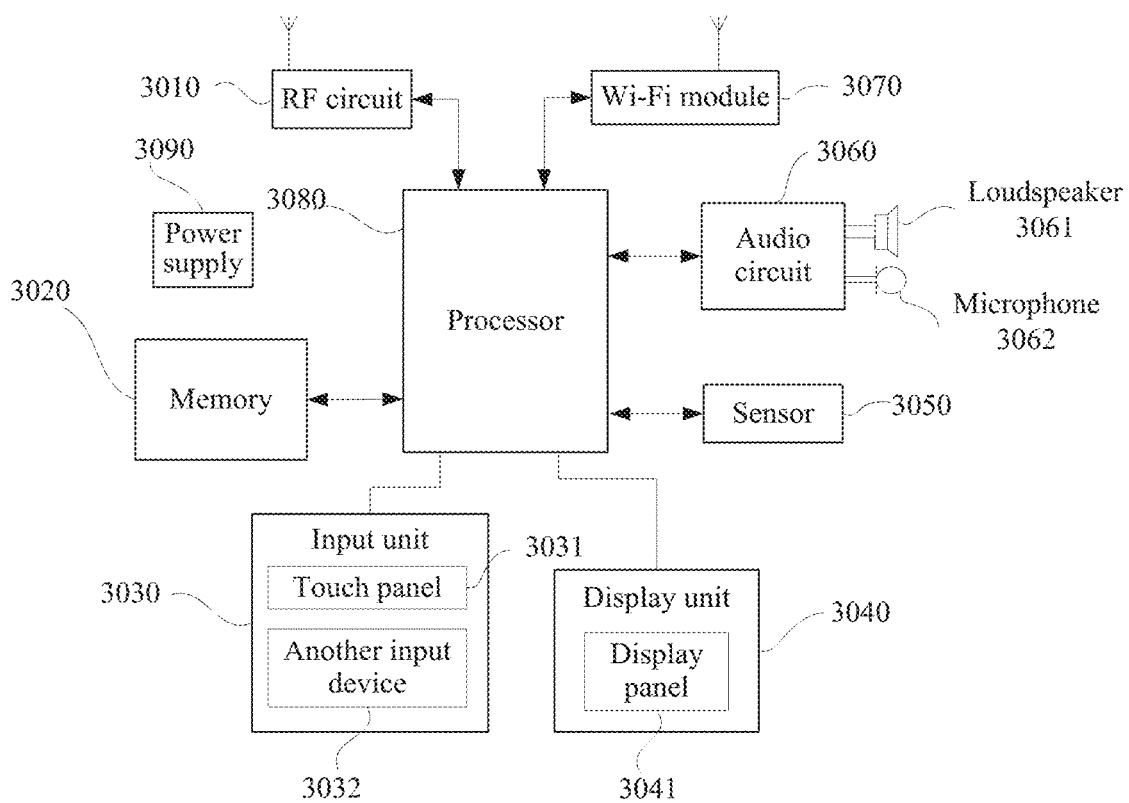
FIG. 30 is a schematic diagram of another embodiment of a terminal according to embodiments of this application.

The foregoing describes the terminal in this application from the perspective of functional modules. The following describes the terminal in this application from the perspective of physical hardware. As shown in FIG. 30, for ease of description, only a part related to the embodiments of the present invention is shown. For technical details not disclosed, refer to the method part in the embodiments of the present invention. The terminal may be any terminal device such as a mobile phone, a tablet computer, a PDA (Personal Digital Assistant, personal digital assistant), a POS (Point of Sales, point of sale), or a vehicle-mounted computer. For example, the terminal is a mobile phone.

FIG. 30 is a block diagram of a partial structure of a mobile phone related to the terminal provided in the embodiments of the present invention. Referring to FIG. 30, the mobile phone includes components such as a radio frequency (Radio Frequency, RF) circuit 3010, a memory 3020, an input unit 3030, a display unit 3040, a sensor 3050, an audio circuit 3060, a wireless fidelity (wireless fidelity, Wi-Fi) module 3070, a processor 3080, and a power supply 3090. A person skilled in the art can understand that the mobile phone structure shown in FIG. 30 does not constitute any limitation on the mobile phone, and the mobile phone may include more or fewer components than those shown in the figure, or a combination of some components, or components disposed differently.

The following describes in detail the components of the mobile phone with reference to FIG. 30.

The RF circuit 3010 may be configured to send and receive signals in information sending and receiving processes or during a call. In particular, the RF circuit 3010 may receive downlink information from a base station, and send the downlink information to the processor 3080 for processing. In addition, the RF circuit 3010 sends related uplink data to the base station. Generally, the RF circuit 3010 includes but is not limited to an antenna, at least one amplifier, a transceiver, a coupler, a low noise amplifier (Low Noise Amplifier, LNA), a duplexer, and the like. In addition, the RF circuit 3010 may also communicate with a network and another device through wireless communication. Any communication standard or protocol may be used for the wireless communication, including but not limited to global system for mobile communications (Global System of Mobile communication, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

The memory 3020 may be configured to store a software program and a module. The processor 3080 executes various function applications and data processing of the mobile phone by running the software program and the module stored in the memory 3020. The memory 3020 may mainly include a program storage area and a data storage area. The program storage area may store an operating system, an application program required for at least one function (such as a sound playback function and an image playback function), and the like. The data storage area may store data (such as audio data and a phone book) that is created according to use of the mobile phone, and the like. In addition, the memory 3020 may include a high-speed random access memory, or may include a non-volatile memory such as at least one magnetic disk storage device, a flash memory device, or another volatile solid-state storage device.

The input unit 3030 may be configured to receive entered numeric or character information, and generate a key signal input related to user settings and function control of the mobile phone. Specifically, the input unit 3030 may include a touch panel 3031 and another input device 3032. The touch panel 3031, also referred to as a touchscreen, may collect a touch operation performed by a user on or near the touch panel 3031 (for example, an operation performed on or near the touch panel 3031 by the user by using a finger, a stylus, or any other suitable object or accessory), and drive a corresponding connected apparatus according to a preset program. Optionally, the touch panel 3031 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into touch point coordinates, and sends the touch point coordinates to the processor 3080, and can receive a command sent by the processor 3080 and execute the command. In addition, the touch panel 3031 may be implemented in a plurality of types, such as a resistive type, a capacitive type, an infrared type, and a surface acoustic wave type. In addition to the touch panel 3031, the input unit 3030 may further include another input device 3032. Specifically, the another input device 3032 may include but is not limited to one or more of a physical keyboard, a function key (such as a volume control button or a switch button), a trackball, a mouse, and a joystick.

The display unit 3040 may be configured to display information entered by the user, information provided for the user, and various menus of the mobile phone. The display unit 3040 may include a display panel 3041. Optionally, the display panel 3041 may be configured in a form of a liquid crystal display (Liquid Crystal Display, LCD), an organic light-emitting diode (Organic Light-Emitting Diode, OLED), or the like. Further, the touch panel 3031 may cover the display panel 3041. After detecting a touch operation on or near the touch panel 3031, the touch panel 3031 sends information about the touch operation to the processor 3080 to determine a touch event type. Then, the processor 3080 provides a corresponding visual output on the display panel 3041 based on the touch event type. Although in FIG. 30, the touch panel 3031 and the display panel 3041 are used as two separate components to implement input and input functions of the mobile phone, yet in some embodiments, the touch panel 3031 may be integrated with the display panel 3041 to implement the input and output functions of the mobile phone.

The mobile phone may further include at least one sensor 3050, such as a light sensor, a motion sensor, or another sensor. Specifically, the light sensor may include an ambient light sensor and a proximity sensor. The ambient light sensor may adjust luminance of the display panel 3041 based on brightness of ambient light. The proximity sensor may turn off the display panel 3041 and/or backlight when the mobile phone approaches an ear. As a type of motion sensor, an accelerometer sensor can detect values of acceleration in different directions (usually three axes), can detect a value and a direction of gravity when the mobile phone is static, and can be used for application of mobile phone posture identification (such as switching between landscape and portrait modes, a related game, and magnetometer posture calibration), a vibration-recognition related function (such as a pedometer and a tap), and the like. A gyroscope, a barometer, a hygrometer, a thermometer, an infrared sensor, and another sensor may be further configured for the mobile phone, and details are not described herein.

The audio circuit 3060, a loudspeaker 3061, and a microphone 3062 can provide an audio interface between the user and the mobile phone. The audio circuit 3060 may transmit, to the loudspeaker 3061, an electric signal that is obtained through conversion of received audio data, and the loudspeaker 3061 converts the electric signal into a sound signal and outputs the sound signal. In addition, the microphone 3062 converts a collected sound signal into an electric signal: the audio circuit 3060 receives the electric signal and converts the electric signal into audio data, and outputs the audio data to the processor 3080 for processing; and processed audio data is sent to, for example, another mobile phone through the RF circuit 3010, or the audio data is output to the memory 3020 for further processing.

Wi-Fi belongs to a short-distance wireless transmission technology. By using the Wi-Fi module 3070, the mobile phone can help the user send and receive emails, browse web pages, access streaming media, and the like. The Wi-Fi module 3070 provides the user with wireless broadband Internet access. Although FIG. 30 shows the Wi-Fi module 3070, it can be understood that the Wi-Fi module 3070 is not a necessary constituent of the mobile phone, and definitely may be omitted depending on a requirement without changing the essence of the present invention.

The processor 3080 is a control center of the mobile phone, and connects to various parts of the entire mobile phone by using various interfaces and lines. The processor 3080 executes various functions of the mobile phone and processes data by running or executing the software program and/or the module stored in the memory 3020, and by invoking data stored in the memory 3020, so as to monitor the entire mobile phone. Optionally, the processor 3080 may include one or more processing units. An application processor and a modem processor may be integrated into the processor 3080. The application processor mainly processes an operating system, a user interface, an application program, and the like. The modem processor mainly handles wireless communication. It can be understood that the modem processor may be alternatively not integrated into the processor 3080.

The mobile phone further includes the power supply 3090 (for example, a battery) that supplies power to various components. The power supply may be logically connected to the processor 3080 by using a power management system, so as to implement functions such as charging management, discharging management, and power consumption management by using the power management system.

Although not shown, the mobile phone may further include a camera, a Bluetooth module, and the like, and details are not described herein.

Based on the terminal shown in FIG. 30, in another embodiment of the terminal provided in this application, the processor 3080 included in the terminal may perform the following steps:

controlling a display to present a lock screen interface;

obtaining an unlocking operation, where the unlocking operation includes at least one of an operation performed in the lock screen interface and an operation performed in a fingerprint recognition area;

if a quantity of unlocking failures reaches M, controlling the display to present a prompt interface, where the prompt interface is used to prompt a user to enter a preset operation, M is less than N, and N is a quantity of unlocking failures that triggers a security mode; and obtaining the preset operation triggered by the user, and controlling the display to present the lock screen interface.

Optionally, in this embodiment, the processor 3080 further performs the following step:

obtaining an operation different from the preset operation, and presenting the prompt interface.

Optionally, in this embodiment, the unlocking operation includes at least one accidental touch operation, and the accidental touch operation is a touch operation in an accidental touch scenario.

Optionally, in this embodiment, the preset operation is a sliding operation corresponding to preset sliding information, and the preset sliding information includes at least one of the following: a preset sliding start point, a preset sliding end point, a preset sliding track, preset sliding duration, and a preset sliding length.

Optionally, in this embodiment, the preset operation is a tap operation corresponding to preset tap information, and the preset tap information includes at least one of the following: a preset tap position, preset tap duration, and a preset tap order.

Optionally, in this embodiment, the preset operation is sliding a specific element to a preset position.

For the steps performed by the processor 3080 in this embodiment, refer to descriptions about the method procedure in the embodiment corresponding to FIG. 9, and details are not described herein again. The processor 3080 specifically further performs the following steps:

if the quantity of unlocking failures reaches M, giving, by the terminal, an alert; and after obtaining the preset operation that is triggered by the user based on the prompt interface, stopping the alert.

Based on the terminal shown in FIG. 30, in another embodiment of the terminal provided in this application, the processor 3080 may perform the following steps:

controlling a display to present a lock screen interface;

obtaining an unlocking operation, where the unlocking operation includes at least one of an operation performed in the lock screen interface and an operation performed in a fingerprint recognition area;

if a quantity of unlocking failures reaches M, giving an alert; and obtaining a stop instruction entered by the user, and stopping the alert.

Optionally, in this embodiment, the processor 3080 further performs the following step:

if the quantity of unlocking failures reaches M, displaying a prompt interface, where the prompt interface is used to prompt the user to enter a preset operation; and the stop instruction is an instruction triggered by the preset operation.

For the steps performed by the processor 3080 in this embodiment, refer to descriptions about the method procedure in the embodiment corresponding to FIG. 24, and details are not described herein again.

Based on the terminal shown in FIG. 30, in another embodiment of the terminal provided in this application, the processor 3080 included in the terminal is configured to perform the following steps:

controlling a display to display a lock screen interface;

obtaining a touch operation, where the touch operation includes at least one of an operation performed in the lock screen interface and an operation performed in a fingerprint recognition area; and if determining, based on the touch operation, that the terminal is in an accidental touch scenario, performing an operation related to a security mode.

Optionally, in this embodiment, the processor 3080 specifically performs the following step:

skipping responding to the touch operation; or ignoring an unlocking failure caused by the touch operation; or increasing a security trigger quantity, where the security trigger quantity is a quantity of unlocking failures that triggers the security mode; or decreasing locking duration in the security mode corresponding to the touch operation; or enabling an anti-accidental-touch mode; or displaying a prompt interface, where the prompt interface is used to prompt the user to enter a preset operation; or giving an alert, where the alert includes at least one of the following: ringing, vibration, light flashing, screen-on, a voice alert, and music.

Optionally, in this embodiment, the lock screen interface is a pattern unlocking interface, and the processor 3080 specifically performs the following step:

determining that touch duration corresponding to the touch operation is less than a first threshold; or determining that a touch track length corresponding to the touch operation is less than a second threshold; or determining that a quantity of touch points corresponding to the touch operation is greater than 1; or determining that touch point coordinates corresponding to the touch operation include coordinates in an accidental touch area.

Optionally, in this embodiment, the lock screen interface is a password unlocking interface, and the processor 3080 specifically performs the following step:

determining that touch duration corresponding to the touch operation is greater than a third threshold; or determining that a touch track length corresponding to the touch operation is greater than a fourth threshold; or determining that a quantity of touch points corresponding to the touch operation is greater than 1; or determining that touch point coordinates corresponding to the touch operation include coordinates in an accidental touch area.

Optionally, in this embodiment, the lock screen interface is a fingerprint unlocking interface, and the processor 3080 specifically performs the following step:

determining that touch duration of the touch operation is greater than a fifth threshold; or determining that a touch point corresponding to the touch operation includes a touch point in a non-fingerprint-recognition area.

For a specific performing procedure of the steps performed by the processor 3080 in this embodiment, refer to descriptions about the method procedure in the embodiment corresponding to FIG. 4, and details are not described herein again.

An embodiment of this application further provides a computer storage medium. The computer storage medium is configured to store a computer software instruction for use by the foregoing terminal, and includes a program designed for the terminal for execution.

An embodiment of this application further provides a computer program product. The computer program product includes a computer software instruction, and the computer software instruction may be loaded by using a processor, to implement the procedure in the lock screen interface processing method in any one of FIG. 4, FIG. 9, or FIG. 24.

All or some of the foregoing embodiments may be implemented by using software, hardware, firmware, or any combination thereof. When software is used for implementation, the embodiments may be implemented completely or partially in a form of a computer program product.

The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It can be clearly understood by a person skilled in the art that, for the purpose of ease and brevity of description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. Indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or network device, or the like) to perform all or some of the steps of the methods described in the embodiments of this application. The foregoing storage medium includes any medium that can store program code, such as a USB flash drive, a removable hard disk, a read-only memory (English full name: Read-Only Memory, ROM for short), a random access memory (English full name: Random Access Memory, RAM for short), a magnetic disk, or a compact disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A lock screen interface processing method implemented by a terminal, comprising:

presenting a lock screen interface;

receiving an unlocking operation, wherein the unlocking operation comprises a first operation performed in the lock screen interface or a second operation performed in a fingerprint recognition area;

presenting a prompt interface when a first quantity of unlocking failures reaches M, wherein the prompt interface prompts a user to enter a preset operation, wherein M is less than N, and wherein N is a second quantity of unlocking failures that triggers a security mode;
obtaining the preset operation from the user; and
presenting the lock screen interface in response to the preset operation.

2. The lock screen interface processing method of claim 1, wherein after presenting the prompt interface, the lock screen interface processing method further comprises:
obtaining a third operation; and
presenting the prompt interface in response to the third operation.

3. The lock screen interface processing method of claim 1, wherein the unlocking operation comprises an accidental touch operation, and wherein the accidental touch operation is in an accidental touch scenario.

4. The lock screen interface processing method of claim 3, wherein the lock screen interface is a pattern unlocking interface, and wherein the accidental touch operation comprises at least one of:
a first touch operation performed in the pattern unlocking interface, wherein a touch duration of the first touch operation is less than a first threshold;
a second touch operation performed in the pattern unlocking interface, wherein a touch track length of the second touch operation is less than a second threshold;
a third touch operation performed in the pattern unlocking interface, wherein the third touch operation comprises more than one touch point; or
a fourth touch operation performed in the pattern unlocking interface, wherein touch point coordinates of the fourth touch operation comprise coordinates in an accidental touch area.

5. The lock screen interface processing method of claim 3, wherein the lock screen interface is a password unlocking interface, and wherein the accidental touch operation comprises at least one of:
a first touch operation performed in the password unlocking interface, wherein a touch duration of the first touch operation is greater than a third threshold;
a second touch operation performed in the password unlocking interface, wherein a touch track length of the second touch operation is less than a fourth threshold;
a third touch operation performed in the password unlocking interface, wherein the third touch operation comprises more than one touch point; or
a fourth touch operation performed in the password unlocking interface, wherein touch point coordinates of the fourth touch operation comprise coordinates in an accidental touch area.

6. The lock screen interface processing method of claim 3, wherein the lock screen interface is a fingerprint unlocking interface, and wherein the accidental touch operation comprises at least one of:
a first touch operation performed in the fingerprint recognition area, wherein a touch duration of the first touch operation is greater than a fifth threshold; or
a second touch operation comprising a touch point in a non-fingerprint-recognition area.

7. The lock screen interface processing method of claim 1, wherein the preset operation is a sliding operation corresponding to preset sliding information, and wherein the preset sliding information comprises at least one of a preset sliding start point, a preset sliding end point, a preset sliding track, a preset sliding duration, or a preset sliding length.

8. The lock screen interface processing method of claim 1, wherein the preset operation is a tap operation corresponding to preset tap information, and wherein the preset tap information comprises at least one of a preset tap position, a preset tap duration, or a preset tap order.

9. The lock screen interface processing method of claim 1, wherein the preset operation comprises sliding a specific element to a preset position.

10. The lock screen interface processing method of claim 1, wherein the prompt interface prompts the user to:
slide along any track from a pressing point in the prompt interface;
slide along a specific track from the pressing point in the prompt interface;
slide, in an order indicated by arrows, from a first pressing point to a second pressing point and then to a third pressing point;
draw a first specific figure;
draw a second specific figure comprising a first specific element displayed in the prompt interface;
drag a slider to a first specific position;
drag a character matching a formula displayed in the prompt interface to a second specific position;
simultaneously touch a plurality of touch points in the prompt interface;
tap a specific dynamically moving element in the prompt interface;
select a second specific element from a plurality of elements in the prompt interface;
press a third specific position in the prompt interface for a preset duration;
tap a lighted area in the prompt interface;
enter a specific character; or
shake the terminal to make a third specific element in the prompt interface to move to a fourth specific position in the prompt interface.

11. The lock screen interface processing method of claim 1, further comprising:
giving an alert when the first quantity of unlocking failures reaches M; and
stopping the alert after obtaining the preset operation.

12. The lock screen interface processing method of claim 11, wherein the alert comprises at least one of ringing, vibration, light flashing, screen-on, a voice alert, or music.

13. A lock screen interface processing method implemented by a terminal, comprising:
presenting a lock screen interface;
receiving an unlocking operation, wherein the unlocking operation comprises a first operation performed in the lock screen interface or a second operation performed in a fingerprint recognition area;
giving an alert when a quantity of unlocking failures reaches M, wherein M is less than N, and wherein N is a second quantity of unlocking failures that triggers a security mode;
obtaining, after giving the alert, a stop instruction from a user; and
stopping the alert in response to the stop instruction.

14. The lock screen interface processing method of claim 13, further comprising displaying a prompt interface when the quantity of unlocking failures reaches M, wherein the prompt interface prompts the user to enter a preset operation; and
obtaining the stop instruction in response to the preset operation.

15. The lock screen interface processing method of claim 13, wherein the alert comprises at least one of ringing, vibration, light flashing, screen-on, a voice alert, or music.

* * * * *